(12) United States Patent
Bakst et al.

(10) Patent No.: US 12,567,401 B2
(45) Date of Patent: Mar. 3, 2026

(54) EVALUATING RELIABILITY OF AUDIO DATA FOR USE IN SPEECH PROCESSING

(71) Applicant: SRI International, Menlo Park, CA (US)

(72) Inventors: Sarah Bakst, San Francisco, CA (US); Aaron Lawson, Sutter Creek, CA (US); Christopher L. Cobo-Kroenke, San Francisco, CA (US); Allen Stauffer, Queensbury, NY (US)

(73) Assignee: SRI INTERNATIONAL, Menlo Park, CA (US)

( * ) Notice: Subject to any disclaimer, the term of this patent is extended or adjusted under 35 U.S.C. 154(b) by 314 days.

(21) Appl. No.: 18/301,064

(22) Filed: Apr. 14, 2023

(65) Prior Publication Data

US 2023/0335114 A1      Oct. 19, 2023

Related U.S. Application Data

(60) Provisional application No. 63/331,713, filed on Apr. 15, 2022.

(51) Int. Cl.
G10L 15/02      (2006.01)
G10L 15/06      (2013.01)
(Continued)

(52) U.S. Cl.
CPC ............ G10L 15/02 (2013.01); G10L 15/063 (2013.01); G10L 15/08 (2013.01); G10L 15/28 (2013.01); *G10L 2015/081* (2013.01)

(58) Field of Classification Search
CPC ......... G10L 15/08; G10L 17/00; G10L 15/20; G10L 25/84; G10L 25/60
(Continued)

(56) References Cited

U.S. PATENT DOCUMENTS 9,147,401 B2      9/2015   Shriberg et al.
10,133,538 B2    11/2018   McLaren et al.
(Continued)

OTHER PUBLICATIONS

Boles et al., "Voice Biometrics: Deep Learning-based Voiceprint Authentication System" IEEE Conferences 2017 12th System of System Engineering Conference) SoSE01/06/2017 (Year: 2017).*
(Continued)

*Primary Examiner* — Richemond Dorvil
(74) *Attorney, Agent, or Firm* — Shumaker & Sieffert, P.A.

(57) ABSTRACT

In some examples, a computing system includes a storage device configured to store a machine learning model trained with audio feature values to determine a reliability of an audio segment for performing speech processing; and processing circuitry. The processing circuitry is configured to: receive an audio dataset comprising a sequence of audio segments; extract, for each audio segment of the sequence of audio segments, a set of audio feature values corresponding to a set of audio features; execute the machine learning model to determine, for each audio segment of the sequence of audio segments, a reliability score based on the set of audio feature values corresponding to the respective audio segment, wherein the reliability score indicates a reliability of the audio segment for performing speech processing; and output an indication of the respective reliability scores determined for at least one audio segment of the sequence of audio segments.

20 Claims, 5 Drawing Sheets

(51) Int. Cl.
*G10L 15/08* (2006.01)
*G10L 15/28* (2013.01)
(58) Field of Classification Search
USPC ........................................................ 704/236
See application file for complete search history.

(56) References Cited

U.S. PATENT DOCUMENTS

| | | | |
|---|---|---|---|
| 10,476,872 B2 * | 11/2019 | McLaren ................ G10L 15/22 | |
| 11,024,291 B2 | 6/2021 | Castan Lavilla et al. | |
| 11,823,658 B2 * | 11/2023 | McLaren ................ G10L 15/10 | |
| 12,035,106 B2 * | 7/2024 | Lawson ............. G06F 18/2413 | |
| 2014/0278412 A1 | 9/2014 | Scheffer et al. | |
| 2016/0248768 A1 | 8/2016 | Mclaren et al. | |
| 2016/0283185 A1 | 9/2016 | Mclaren et al. | |
| 2019/0013013 A1 | 1/2019 | McLaren et al. | |
| 2019/0180771 A1 * | 6/2019 | Yin ......................... G10L 15/22 | |
| 2021/0089907 A1 | 3/2021 | Rogers et al. | |
| 2021/0125629 A1 * | 4/2021 | Bryan ................ G10L 21/0216 | |
| 2022/0044077 A1 | 2/2022 | Lawson et al. | |
| 2022/0093106 A1 * | 3/2022 | Mosayyebpour Kaskari .............. G06N 3/044 | |
| 2022/0111294 A1 * | 4/2022 | Barreiro .................. G06F 40/20 | |
| 2023/0053148 A1 * | 2/2023 | Yu ......................... G06F 40/284 | |
| 2023/0401285 A1 * | 12/2023 | Kobren ................. G06F 18/214 | |
| 2025/0316062 A1 * | 10/2025 | Salamon ................. G10L 25/30 | |

OTHER PUBLICATIONS

Beck et al., "A Bilingual Multi-Modal Voice Corpus for Language and Speaker Recognition (LASR) Services", The Speaker and Language Recognition Workshop, May 31, 2004, 6 pp.
Boril et al., "Unsupervised Equalization of Lombard Effect for Speech Recognition in Noisy Adverse Environments," IEEE Transactions Audio, Speech, and Language Processing, vol. 18, No. 6, Aug. 2010, pp. 1379-1393.
Bou-Ghazale et al., "A Comparative Study of Traditional and Newly Proposed Features for Recognition of Speech Under Stress," IEEE Transactions on Speech & Audio Processing, vol. 8, No. 4, Jul. 2000, pp. 429-442.
Bou-Ghazale et al., "HMM-Based Stressed Speech Modeling with Application to Improved Synthesis and Recognition of Isolated Speech Under Stress," IEEE Transactions on Speech & Audio Processing, vol. 6, No. 3, May 1998, pp. 201-216.
Campbell et al., "Estimating and evaluating confidence for forensic speaker recognition", Proceedings. (ICASSP '05). IEEE International Conference on Acoustics, Speech, and Signal Processing, 2005, Mar. 23, 2005, Page?.
Espy-Wilson et al., "A New Set of Features for Text-Independent Speaker Identification", Ninth International Conference on Spoken Language Processing, Sep. 17, 2006, 4 pp.
Fan et al., "Acoustic Analysis and Feature Transformation from Neutral to Whisper for Speaker Identification within Whispered Speech Audio Streams," Speech Communication, vol. 55, Jan. 2013, pp. 119-134.
Fan et al., "Speaker Identification within Whispered Speech Audio Streams," IEEE Transactions Audio, Speech and Language Processing, vol. 19, No. 5, Jul. 2011, pp. 1408-1421.
Fenu et al., "Improving Fairness in Speaker Recognition", Proceedings of the 2020 European Symposium on Software Engineering, Nov. 2020, 8 pp.
Ferrer et al., "A Noise-Robust System for NIST 2012 Speaker Recognition Evaluation," SRI International Menlo Park CA Speech Technology and Research Laboratory, Aug. 2013, 6 pp.
Ferrer et al., "A Speaker Verification Backend with Robust Performance across Conditions", Computer Science and Language, vol. 71, Aug. 18, 2021, 53 pp.
Ferrer et al., "Classification of Lexical Stress using Spectral and Prosodic Features for Computer-Assisted Language Learning Systems", Speech Communication, vol. 69, May 2015, 20 pp.

Ferrer et al., "A Unified Approach for Audio Characterization and its Application to Speaker Recognition," Odyssey 2012—The Speaker and Language Recognition Workshop, Singapore, 2012, 7 pp. (Applicant points out, in accordance with MPEP 609.04(a), that the year of publication, 2012, is sufficiently earlier than the effective U.S. filing date, so that the particular month of publication is not in issue.).
Ferrer et al., "Promoting robustness for speaker modeling in the community: the PRISM evaluation set," Proceedings of NIST 2011 workshop, Atlanta, Dec. 2011, 7 pp.
Garcia-Romero et al., "Analysis of I-vector Length Normalization in Speaker Recognition Systems", Twelfth annual conference of the international speech communication association, Aug. 2011, pp. 249-252.
Ghaffarzadegan et al., "Generative Modeling of Pseudo-Whisper for Robust Whispered Speech Recognition," IEEE Transactions Audio, Speech, and Language Processing, vol. 24, No. 10, Oct. 2016, pp. 1705-1720.
Ghaffarzadegan et al., "UT-Vocal Effort II: Analysis and Constrained-Lexicon Recognition of Whispered Speech," 2014 IEEE International Conference on Acoustics, Speech and Signal Processing (ICASSP), Florence, Italy, May 4-9, 2014, pp. 2563-2567.
Gillespie et al., "Speech Dereverberation via Maximum-Kurtosis Subband Adaptive Filtering", 2001 IEEE International Conference on Acoustics, Speech, and Signal Processing. Proceedings (Cat. No. 01CH37221), vol. 6, May 7, 2001, 4 pp.
Godin et al., "Analysis of the effects of physical task stress on the speech signal," Journal of the Acoustical Society of America, vol. 130, No. 6, Dec. 2011, pp. 3992-3998.
Hansen et al., "Analysis and Compensation of Lombard Speech Across Noise Type and Levels With Application to In-Set/Out-of-Set Speaker Recognition," IEEE Transactions Audio, Speech & Language Processing, vol. 17, No. 2, Feb. 2009, pp. 366-378.
Hansen et al., "Feature Analysis and Neural Network based Classification of Speech under Stress," IEEE Transactions on Speech & Audio Processing, vol. 4, No. 4, Jul. 1996, pp. 307-313.
Hansen et al., "Speaker Recognition by Machines and Humans: A Tutorial Review," IEEE Signal Processing Magazine, Nov. 2015, pp. 74-99.
Hansen et al., "TEO-based Speaker Stress Assessment using Hybrid Classification and Tracking Schemes," International Journal Speech Technology, vol. 15, Issue 3, Sep. 2012, pp. 295-311.
Hansen, "Analysis and Compensation of Speech under Stress and Noise for Environmental Robustness in Speech Recognition," Speech Communication, Special Issue on Speech Under Stress, vol. 20(2), Nov. 1996, pp. 151-173.
Hansen, "Getting Started with SUSAS: A Speech Under Simulated and Actual Stress Database," Eurospeech, vol. 4, Rhodes, Greece, Sep. 1997, 4 pp.
Hansen, "Robust Emotional Stressed Speech Detection using Weighted Frequency Subbands," EURASIP Journal on Advances in Signal Processing: Special Issue on Emotion and Mental State Recognition from Speech, Apr. 2011, 10 pp.
Hansen, et al., "Driver Modeling for Detection & Assessment of Driver Distraction: Examples from the UTDrive Test Bed," IEEE Signal Processing Magazine, Jul. 2017, 13 pp.
Hayashida et al., "Close/distant talker discrimination based on kurtosis of linear prediction residual signals", 2014 IEEE International Conference on Acoustics, Speech and Signal Processing (ICASSP), May 4, 2014, 5 pp.
He et al., "Between-speaker variability and temporal organization of the first formant", The Journal of the Acoustical Society of America, vol. 145, No. 3, Mar. 11, 2019, EL209-EL214 pp.
Hicklin et al., "Assessing the clarity of friction ridge impressions", Forensic Science International, vol. 226, No. 1-3, Mar. 10, 2013, 106-117 pp.
Huggins et al., "Confidence Metrics for Speaker Identification", Seventh International Conference on Spoken Language Processing, Sep. 16, 2002, 4 pp.
Kaushik et al., "Automatic Sentiment Detection in Naturalistic Audio," IEEE Transactions on Audio, Speech, and Language Processing, vol. 25, No. 8, Aug. 2017, pp. 1668-1679.

(56)  References Cited

OTHER PUBLICATIONS

Kaushik et al., "Automatic Audio Sentiment Extraction Using Keyword Spotting," Sixteenth Annual Conference of the International Speech Communication Association, Sep. 6-10, 2015, 5 pp.

Lawson et al., "Long Term Examination of Intra-Session and Inter-Session Speaker Variability," Research Associates for Defense Conversion (RADC), Marcy, NY, Mar. 2009, 4 pp.

Lei et al., "A Deep Neural Network Speaker Verification System Targeting Microphone Speech," Fifteenth Annual Conference of the International Speech Communication Association, Sep. 2014, pp. 681-685.

Lei et al., "A novel scheme for speaker recognition using a phonetically-aware deep neural network," 2014 IEEE International Conference on Acoustics, Speech and Signal Processing (ICASSP), May 2014, 6 pp.

Lei et al., "Simplified VTS-based i-vector extraction in noise-robust speaker recognition," 2014 IEEE International Conference on Acoustics, Speech and Signal Processing (ICASSP), May 2014. 5 pp.

Lu et al., "The Effect of Language Factors for Robust Speaker Recognition", 2009 IEEE International Conference on Acoustics, Speech and Signal Processing, Apr. 19, 2009, 4217-4220 pp.

Mariooryad et al., "Exploring cross-modality affective reactions for audiovisual emotion recognition," IEEE Transactions on Affective Computing, vol. 4, No. 2, Jan. 2013, 15 pp.

Mcdougall et al., "Discrimination of Speakers Using the Formant Dynamics of /u:/ in British English", Proceedings of the International Congress of Phonetic Sciences, Aug. 6, 2007, 1825-1828 pp.

McLaren et al. "Combining Continuous Progressive Model adaptation and Factor Analysis for Speaker Verification," Proceedings of the 9th Annual Conference of the International Speech Communication Association (Interspeech 2008) incorporating the 12th Australasian International Conference on Speech Science and Technology, International Speech Communication Association, Sep. 2008, pp. 857-860.

McLaren et al. "Application of convolutional neural networks to speaker recognition in noisy conditions," Fifteenth Annual Conference of the International Speech Communication Association, Sep. 2014, pp. 686-690.

McLaren et al., "A Comparison of Session Variability Compensation Approaches for Speaker Verification" IEEE Transactions on Information Forensics and Security, vol. 5. No. 4, Aug. 2010, 8 pp.

McLaren et al., "Advances in Deep Neural Network Approaches to Speaker Recognition," 2015 IEEE international conference on acoustics, speech and signal processing (ICASSP), Apr. 2015, pp. 4814-4818.

McLaren et al., "Exploring the Role of Phonetic Bottleneck Features for Speaker and Language Recognition," 2016 IEEE International Conference on Acoustics, Speech and Signal Processing (ICASSP), Mar. 2016, pp. 5575-5579.

Mclaren et al., "How to Train Your Speaker Embeddings Extractor", The Speaker and Language Recognition Workshop (Odyssey 2018), Jun. 26, 2018, pp. 327-334.

McLaren et al., "Improved Speaker Recognition Using DCT Coefficients as Features," 2015 IEEE International Conference on Acoustics, Speech and Signal Processing (ICASSP), Apr. 2015, pp. 4430-4434.

McLaren et al., "On the Issue of Calibration in DNNbased Speaker Recognition Systems," Interspeech, Sep. 2016, pp. 1825-1829.

Mclaren et al., "Softsad: Integrated Frame-Based Speech Confidence for Speaker Recognition", IEEE International Conference on Acoustics, Apr. 19, 2015, 5 pp.

Mclaren et al., "Trial-Based Calibration for Speaker Recognition in Unseen Conditions", Proc. Odyssey, Jun. 16, 2014, 19-25 pp.

McLaren et al., "Effective use of DCTs for Contextualizing Features for Speaker Recognition," 2014 IEEE International Conference on Acoustics, Speech and Signal Processing (ICASSP), May 2014, pp. 4027-4031.

McLaren et al., "Improving robustness to compressed speech in speaker recognition," Interspeech, Aug. 2013, pp. 3698-3702.

McLaren, "Data-driven Impostor Selection for T-norm score Normalisation and the Background Dataset in SVM-based Speaker Verification," Advances in Biometrics, Jun. 2009, pp. 474-483.

Morrison et al., "An empirical estimate of the precision of likelihood ratios from a forensic-voice-comparison system," Forensic Science International, vol. 208, May 2011, pp. 59-65.

Morrison et al., "Assessing the admissibility of a new generation of forensic voice comparison testimony," Columbia Science and Technology Law Review, vol. 18, Spring 2016, pp. 326-434.

Park et al., "Using Voice Quality Features to Improve Short-Utterance, Text-Independent Speaker Verification Systems", Interspeech, Aug. 20, 2017, 5 pp.

Parthasarathy et al., "Predicting Speaker Recognition Reliability by Considering Emotional Content", 2017 Seventh International Conference on Affective Computing and Intelligent Interaction (ACII), Oct. 23, 2017, 434-439 pp.

Parthasarathy et al., "Defining Emotionally Salient Regions using Qualitative Agreement Method," Interspeech, San Francisco, CA, USA, Sep. 2016, pp. 3598-3602.

Patil et al., "The physiological microphone (PMIC): A competitive alternative for speaker assessment in stress detection and speaker verification," Speech Communication: Special Issue on Silent Speech Interfaces, vol. 52, No. 4, Apr. 2010, pp. 327-340.

Poh et al., "Estimating the confidence interval of expected performance curve in biometric authentication using joint bootstrap," 2007 IEEE International Conference on Acoustics, Speech and Signal Processing—ICASSP'07, vol. 2, Apr. 2007, 11 pp.

President's Council of Advisors on Science and Technology 2016 Report, "Forensic science in criminal courts: Ensuring scientific validity of feature-comparison methods," Sep. 2016, 174 pp.

Prince et al., "Probabilistic Linear Discriminant Analysis for Inferences About Identity", 2007 IEEE 11th International Conference on Computer Vision, Oct. 14, 2007, 8 pp.

R Core Team, "The R Project for Statistical Computing", R Foundation for Statistical Computing, Vienna, Austria, Retrieved from: https://www.r-project.org/, Accessed on : Jul. 17, 2023, 3 pp.

Richiardi et al., "Speaker Verification With Confidence and Reliability Measures", 2006 IEEE International Conference on Acoustics Speech and Signal Processing Proceedings., vol. 1, May 14, 2006, 1-4 pp.

Sanchez et al., "Multi-System Fusion of Extended Context Prosodic and Cepstral Features for Paralinguistic Speaker Trait Classification," Thirteenth Annual Conference of the International Speech Communication Association, Sep. 2012, 4 pp.

Shriberg et al., "Effects of Vocal Effort and Speaking Style on Text-Independent Speaker Verification," Ninth Annual Conference of the International Speech Communication Association, Sep. 2008, 4 pp.

Snyder, "NIST SRE 2016 Xvector Recipe", Retrieved from: https://david-ryan-snyder.github.io/2017/10/04/model_sre16_v2.html, Oct. 4, 2017, 3 pp.

Talkin, "A Robust Algorithm for Pitch Tracking (RAPT)", Speech Coding and Synthesis, Elsevier Science, 1995, pp. 495-502, (Applicant points out, in accordance with MPEP 609.04(a), that the year of publication, 1995, is sufficiently earlier than the effective U.S. filing date, so that the particular month of publication is not an issue.).

Villalba et al., "Analysis of speech quality measures for the task of estimating the reliability of speaker verification decisions", Speech Communication, vol. 78, Apr. 2016, 42-61 pp.

Villalba et al., "Reliability Estimation of the Speaker Verification Decisions Using Bayesian Networks to Combine Information from Multiple Speech Quality Measures", Advances in Speech and Language Technologies for Iberian Languages, Nov. 21, 2012, 10 pp.

Womack et al., "Classification of Speech Under Stress using Target Driven Features," Speech Communications, Special Issue on Speech Under Stress, vol. 20, No. 1-2, Nov. 1996, pp. 131-150.

Womack et al., "N-Channel Hidden Markov Models for Combined Stress Speech Classification and Recognition," IEEE Transactions on Speech & Audio Processing, vol. 7, No. 6, Nov. 1999, pp. 668-677.

(56)     References Cited

OTHER PUBLICATIONS

Zhang et al., "An Advanced Entropy-based Feature with Frame-Level Vocal Effort Likelihood Space Modeling for Distant Whisper-Island Detection," Speech Communication, vol. 66, Feb. 2015, pp. 107-117.

Zhang et al., "Analysis and Classification of Speech Mode: Whispered through Shouted," Eighth Annual Conference of the International Speech Communication Association, Aug. 2007, 4 pp.

Zhang et al., "Whisper-Island Detection Based on Unsupervised Segmentation with Entropy-Based Speech Feature Processing," IEEE Transactions Audio, Speech and Language Processing, vol. 19, No. 4, May 2011, pp. 883-894.

Zheng et al., "MobileUTDrive: An Android Portable Device Platform for In-vehicle Driving Data Collection and Display," FAST-zero'15: 3rd International Symposium on Future Active Safety Technology Toward zero traffic accidents, Gothenburg, Sweden, Sep. 9-11, 2015, pp. 317-322.

Zhou et al., "Nonlinear Feature Based Classification of Speech under Stress," IEEE Transactions on Speech & Audio Processing, vol. 9, No. 2, Mar. 2001, pp. 201-216.

* cited by examiner

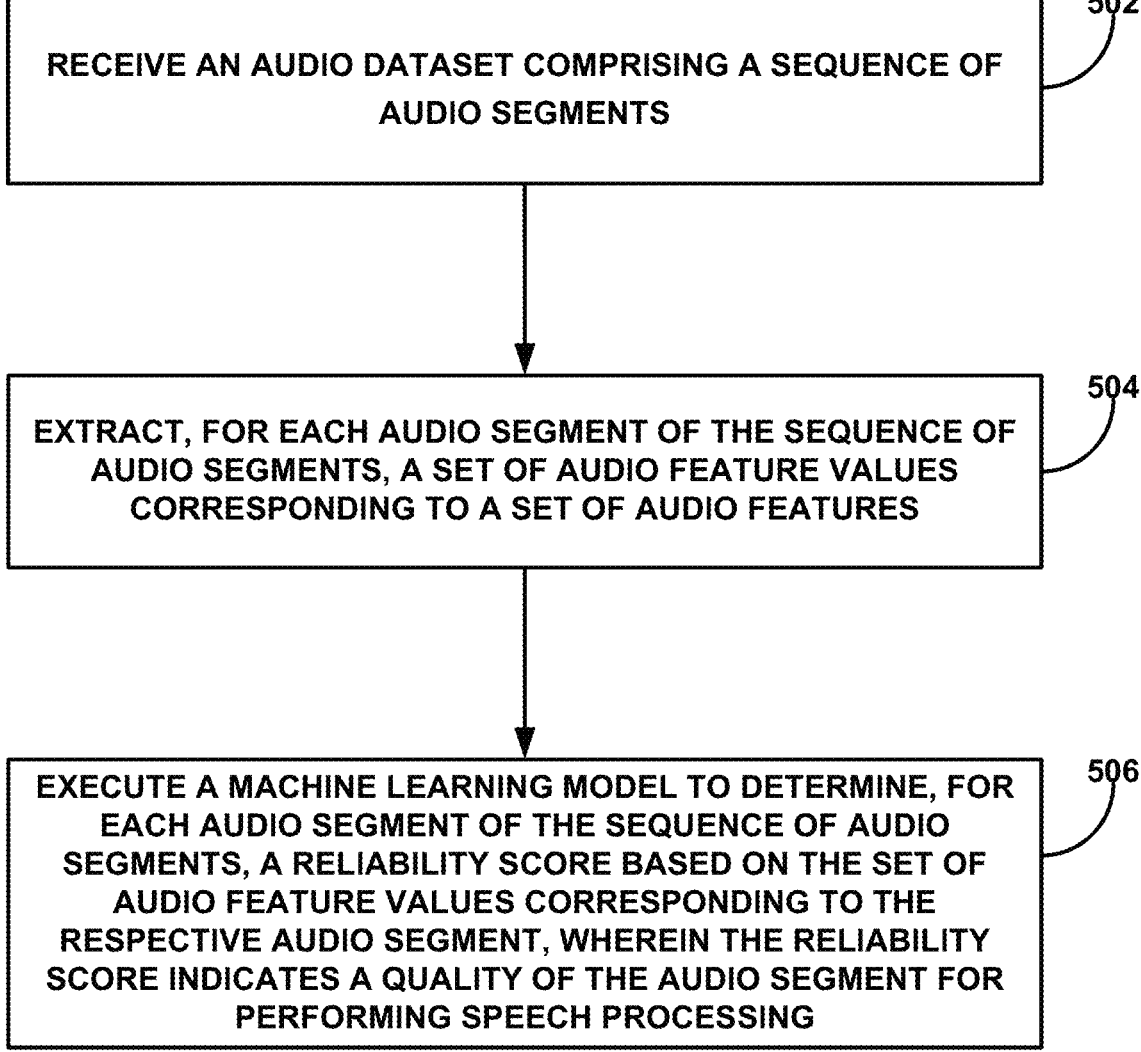

502

RECEIVE AN AUDIO DATASET COMPRISING A SEQUENCE OF AUDIO SEGMENTS

504

EXTRACT, FOR EACH AUDIO SEGMENT OF THE SEQUENCE OF AUDIO SEGMENTS, A SET OF AUDIO FEATURE VALUES CORRESPONDING TO A SET OF AUDIO FEATURES

506

EXECUTE A MACHINE LEARNING MODEL TO DETERMINE, FOR EACH AUDIO SEGMENT OF THE SEQUENCE OF AUDIO SEGMENTS, A RELIABILITY SCORE BASED ON THE SET OF AUDIO FEATURE VALUES CORRESPONDING TO THE RESPECTIVE AUDIO SEGMENT, WHEREIN THE RELIABILITY SCORE INDICATES A QUALITY OF THE AUDIO SEGMENT FOR PERFORMING SPEECH PROCESSING

FIG. 5

EVALUATING RELIABILITY OF AUDIO DATA FOR USE IN SPEECH PROCESSING

This application claims the benefit of U.S. Provisional Patent Application No. 63/331,713, filed Apr. 15, 2022, the entire contents of Which is incorporated herein by reference.

GOVERNMENT RIGHTS

This invention was made with Government support under contract number 15F06719D0000649 awarded by the U.S. Department of Justice. The Government has certain rights in this invention.

TECHNICAL FIELD

This disclosure is related to machine learning systems, and more specifically to executing a machine learning model to evaluate audio data.

BACKGROUND

A system may execute a machine learning model to perform speech processing including speaker identification (SID), For example, the machine learning model may determine a likelihood that an audio sample includes speech from a particular human. The system may train the machine learning model using training data including a plurality of training datasets. For example, to train a supervised learning (SI) model, the system may analyze the plurality of training datasets to generate an inferred function. The system may execute the inferred function in order to evaluate the likelihood that a new audio sample includes speech from the particular human.

SUMMARY

In general, the disclosure describes one or more techniques for determining a reliability of an audio dataset for performing speech processing, A speech processing model such may be configured to determine a likelihood that an audio sample includes genuine speech from a particular human speaker. The speech processing model may, in some examples, be trained using audio samples that are known to be associated with the particular human speaker, To determine whether an audio sample includes genuine speech from a particular human speaker, the speech processing model may process the audio sample to determine an extent to which one or more patterns present in the audio sample are similar to one or more patterns present in training audio samples known to be associated with the particular speaker.

One or more conditions present in an audio sample may affect whether a speech processing model is able to accurately perform speaker identification of the sample. Such conditions may include, for example, whether the sample is recorded in a clean environment or a noisy environment, or whether the sample includes a subject reading out loud or engaging in conversational speech—any of these conditions may affect whether a speech processing model is able to accurately perform speaker identification. The presence of such conditions for audio samples may indicate a reliability of a sample for speaker identification, and a computing system may train an audio reliability machine learning model to identify a set of characteristics, in some cases corresponding to the one or more conditions that may be present in an audio sample, that are most useful for evaluating the reliability of a sample.

In training the audio reliability machine learning model, the computing system may extract one or more characteristics from each training audio dataset of the one or more audio datasets, and the computing system may determine whether a speech processing model is configured to accurately perform speaker identification on each training audio dataset of the one or more audio datasets. Based on the results of the speaker identification, the computing system may identify one or more audio sample characteristics that are most associated with accurate speaker identification and one or more audio sample characteristics that are most associated with inaccurate speaker identification.

The reliability of an audio sample may vary throughout a duration of the sample. For example, background noise may be prevalent at a beginning of an audio sample but may decrease as the sample progresses. The computing system may train the audio reliability machine learning model to identify parts of an audio sample that are most useful for accurately performing speaker identification using a speech processing model. For example, the computing system may divide an incoming audio sample into a sequence of audio segments. Each segment of the sequence of segments may correspond to a time window. The audio reliability machine learning model may determine a reliability of each segment of the sequence of segments for performing speaker identification.

The techniques may provide one or more advantages that realize at least one practical application. For example, by training an audio reliability machine learning model to identify audio sample characteristics that are associated with accurate and inaccurate speaker identification, the computing system may generate a machine learning model that more effectively evaluates audio samples for speaker identification as compared with systems that do not identify audio sample characteristics associated with accurate and inaccurate speaker identification. Furthermore, splitting an audio sample into segments and using a machine learning model to evaluate each segment of the audio sample may enable the computing device to identify the parts of an audio sample that are most likely to produce an accurate speaker identification. This may improve a likelihood that a speech processing model is able to accurately identify a speaker corresponding to the audio sample, because the speech processing model may be more accurate in evaluating high-reliability portions of an audio sample as compared with the accuracy of the speech processing model in evaluating low-reliability portions of the audio sample.

In some examples, a computing system includes a storage device configured to store a machine learning model trained with audio feature values to determine a reliability of an audio segment for performing speech processing; and processing circuitry having access to the storage device. The processing circuitry is configured to: receive an audio dataset comprising a sequence of audio segments; extract, for each audio segment of the sequence of audio segments, a set of audio feature values corresponding to a set of audio features, wherein each audio feature value of the set of audio feature values indicates a prevalence of the corresponding audio feature of the set of audio features in the audio segment; execute the machine learning model to determine, for each audio segment of the sequence of audio segments, a reliability score based on the set of audio feature values corresponding to the respective audio segment, wherein the reliability score indicates a reliability of the audio segment for performing speech processing; and output an indication of the respective reliability scores determined for at least one audio segment of the sequence of audio segments.

In some examples, a method includes receiving, by processing circuitry having access to a storage device configured to store a machine learning model trained with audio feature values to determine a reliability of an audio segment for performing speech processing, an audio dataset comprising a sequence of audio segments; extracting, by the processing circuitry for each audio segment of the sequence of audio segments, a set of audio feature values corresponding to a set of audio features, wherein each audio feature value of the set of audio feature values indicates a prevalence of the corresponding audio feature of the set of audio features in the audio segment; executing, by the processing circuitry, the machine learning model to determine, for each audio segment of the sequence of audio segments, a reliability score based on the set of audio feature values corresponding to the respective audio segment, wherein the reliability score indicates a reliability of the audio segment for performing speech processing; and outputting, by the processing circuitry, an indication of the respective reliability scores determined for at least one audio segment of the sequence of audio segments.

In some examples, a computer-readable medium comprising instructions that, when executed by a processor, cause the processor to: receive an audio dataset comprising a sequence of audio segments; extract, for each audio segment of the sequence of audio segments, a set of audio feature values corresponding to a set of audio features, wherein each audio feature value of the set of audio feature values indicates a prevalence of the corresponding audio feature of the set of audio features in the audio segment; execute a machine learning model to determine, for each audio segment of the sequence of audio segments, a reliability score based on the set of audio feature values corresponding to the respective audio segment, wherein the reliability score indicates a reliability of the audio segment for performing speech processing; and output an indication of the respective reliability scores determined for at least one audio segment of the sequence of audio segments.

In some examples, a computing system includes a storage device configured to store a machine learning model and training data comprising a plurality of training audio datasets, wherein each training audio dataset of the plurality of training audio datasets is known to include speech from a particular target class, wherein each training audio dataset of the plurality of training audio datasets comprises a sequence of training audio segments; and processing circuitry having access to the storage device and configured to train the machine learning model to determine a reliability of an audio segment for performing speech processing. To train the machine learning model, the processing circuitry is configured to: execute a speech processing model to perform a plurality of speech processing determinations, wherein each speech processing determination of the plurality of speech processing determinations involves determining whether a training audio segment of a training audio dataset corresponds to a particular target class; determine, based on the particular target class known to be associated with each training audio dataset of the plurality of training audio datasets, a quality of each speech processing determination of the plurality of speech processing determinations; identify one or more audio features of a plurality of audio features present the training audio segment corresponding to each speech processing determination of the plurality of speech processing determinations; and select a set of audio features of the plurality of audio features based on the quality of each speech processing determination of the plurality of speech processing determinations and the one or more audio features of the plurality of audio features present the audio segment corresponding to each speech processing determination of the plurality of speech processing determinations.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 5 is a flow diagram illustrating an example technique for determining a reliability of audio data for speech processing, in accordance with one or more techniques of this disclosure.

Like reference characters refer to like elements throughout the figures and description.

DETAILED DESCRIPTION

Figure 1:
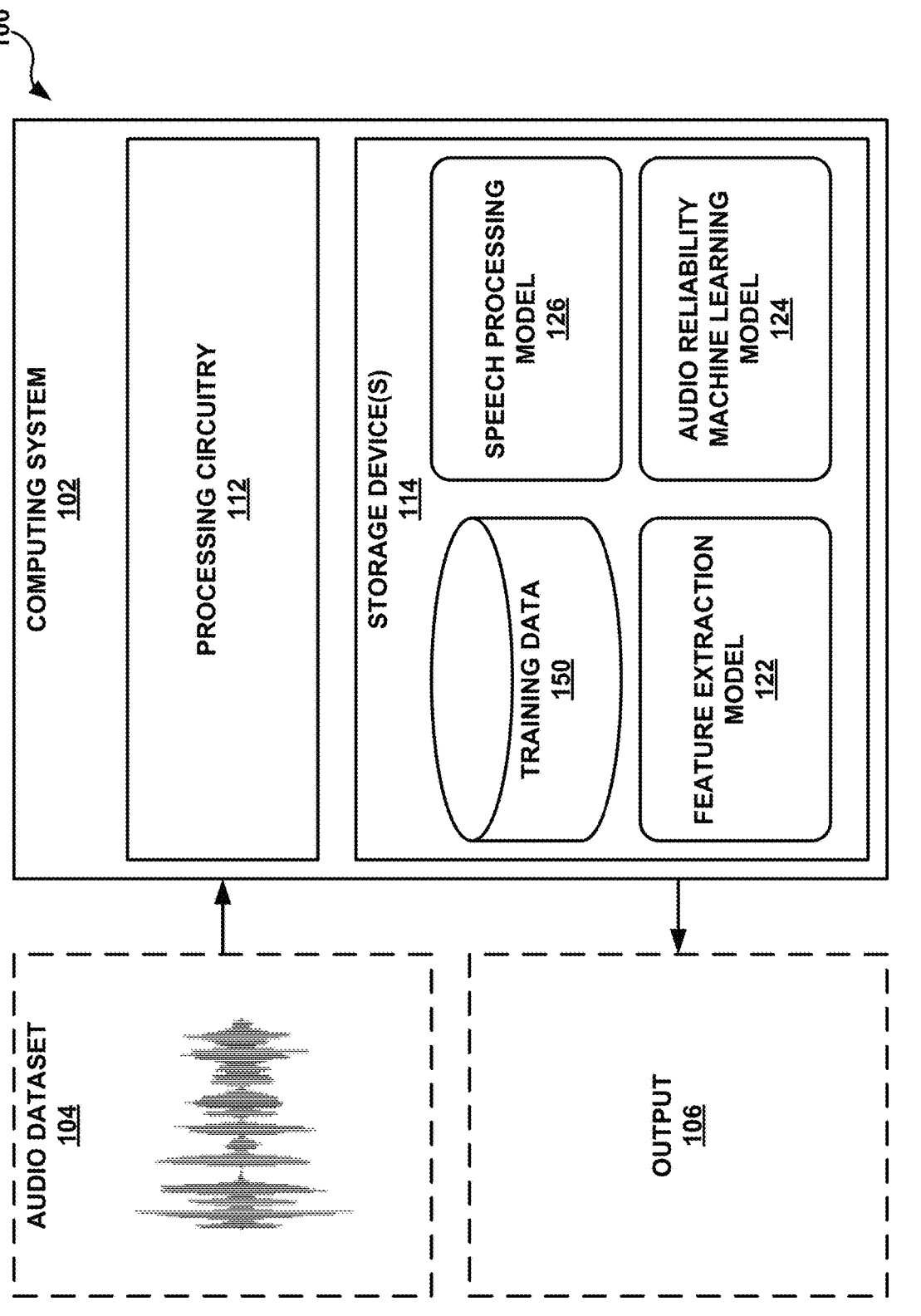
FIG. 1 is a block diagram illustrating a system for training a machine learning model to evaluate a reliability of audio data for speech processing, in accordance with one or more techniques of this disclosure.

FIG. 1 is a block diagram illustrating a system 100 for training a machine learning model to evaluate a reliability of audio data for speech processing, in accordance with one or more techniques of this disclosure. As seen in FIG. 1, system 100 includes computing system 102, audio dataset 104, and output 106. Computing system 102 includes processing circuitry 112 and storage device(s) 114. Storage device(s) 114 may be configured to store feature extraction model 122, audio reliability machine learning model 124, speech processing model 126, and training data 150. Although computing system 102 system 100 is shown in FIG. 1 as processing an audio data, computing system 102 is not limited to processing audio data. Computing system 102 may, in some cases, be configured to process video data, print media data, or another kind of media data.

Computing system 102 may be configured to perform one or more speech processing techniques including speaker identification, speech recognition, language identification, speech activity detection, or any combination thereof. For example, computing system 102 may be configured to process audio dataset 104 to generate an output 106 that indicates whether audio dataset 104 reflects genuine speech from a particular human, i.e., the so-called "speaker-of-interest". Computing system 102 may, in some cases, be configured to process audio dataset 104 to generate an output 106 that indicates whether audio dataset 104 reflects genuine speech from any human speaker, as opposed to synthetic speech that mimics the speech of a human. In any case, one or more audio sample characteristics may affect whether computing system 102 is configured to accurately perform speech processing using audio dataset 104.

In some examples, the term "genuine speech" may be referred to herein as being speech present in an audio sample that was actually spoken by any living human being and recorded to create the audio sample. In some examples, the term "speech by a particular human" may be referred to herein as speech present in an audio sample that was actually spoken by the particular human and recorded to create the audio sample, where the speech was not spoken by any other living human beings other than the particular human. In some examples, the term "synthetic audio data" may be referred to herein as audio data present in an audio sample that is generated by a computer to reflect sound that imitates human speech, but does not reflect actual speech that was spoken by a living human being and recorded to create the audio sample.

Computing system 102 may be configured to receive audio dataset 104. Audio dataset 104 may include audio data. In some examples, the audio data may include a sequence of speech. Additionally, or alternatively, the audio data may include one or more background components such as noise, codec, reverb, and music. In some examples, it may be unknown whether the audio dataset 104 represents a recording of genuine speech from a particular human speaker, or whether the audio dataset 104 represents synthetic speech that is generated to imitate speech of that particular human speaker. In some examples, it may be unknown whether the audio dataset 104 represents a recording of speech by a particular human, or whether the audio dataset 104 represents a recording of speech by a human other than the particular human. Computing system 102 may process audio dataset 104 to generate an output 106 that indicates a probability that audio dataset 104 includes genuine speech from a particular human speaker, a probability that audio dataset 104 includes genuine speech from any human speaker, or any combination thereof.

In some examples, speech processing techniques include a determination of whether speech in an audio sample is part of a target class. For speaker identification, the target class may be speech from a particular human speaker. For language identification, the target class may be speech of a particular language. For speech activity detection, the target class may be any level of human speech.

Computing system 102 may include processing circuitry 112, Processing circuitry 112 may include, for example, one or more microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 112 of computing system 102 may include any suitable structure, whether in hardware, software, firmware, or any combination thereof, to perform the functions ascribed herein to system 100.

Computing system 102 includes one or more storage device(s) 114 in communication with the processing circuitry 112 of computing system 102. In some examples, storage device(s) 114 include computer-readable instructions that, when executed by the processing circuitry 112, cause computing system 102 to perform various functions attributed to system 100 herein. Storage device(s) 114 may include any volatile, non-volatile, magnetic, optical, or electrical media, such as a random-access memory (RAM), read-only memory (ROM), non-volatile RAM (NVRAM), electrically erasable programmable ROM (EEPROM), flash memory, or any other digital media capable of storing information.

Computing system 102 may comprise any suitable computing system having one or more computing devices, such as desktop computers, laptop computers, gaming consoles, smart televisions, handheld devices, tablets, mobile telephones, smartphones, etc. In some examples, at least a portion of computing system 102 is distributed across a cloud computing system, a data center, and/or across a network, such as the Internet, another public or private communications network, for instance, broadband, cellular, Wi-Fi, and/or other types of communication networks, for transmitting data between computing systems, servers, and computing devices. One or more components of computing system 102 (e.g., processing circuitry 112, storage device(s) 114, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 112 of computing system 102 may implement functionality and/or execute instructions associated with computing system 102. Computing system 102 may use processing circuitry 112 to perform operations in accordance with one or more aspects of the present disclosure using software, hardware, firmware, or a mixture of hardware, software, and firmware residing in and/or executing at computing system 102, and may be distributed among one or more devices. The one or more storage device(s) 114 may represent or be distributed among one or more devices.

Computing system 102 may, in some examples, evaluate a large set of task motivated features with example-based machine learning to determine a reliability of audio dataset 104 for speaker identification on a fine-grained level. For example, computing system 102 may split audio dataset 104 into a sequence of audio segments each corresponding to a window of time. In some examples, each audio segments of the sequence of audio segments may start at a point at which a previous audio segment of the sequence of audio segments ends. Each audio segment may correspond to a two-second window of time, but that is not required. Each audio segment may correspond to any amount of time, in some examples, each audio segment may have a same duration of each other audio segment of the sequence of audio segments. In some examples, one or more audio segments may have a duration that is different from a duration of one or more other segments of the sequence of segments.

Computing system 102 may be configured to assess how useful audio dataset 104 is for performing a speech processing technique such as speaker identification. For example, computing system 102 may determine a reliability score corresponding to each audio segment of the sequence of audio segments, where the reliability score indicates a reliability of the audio segment for performing speaker identification. By determining the reliability of each audio segment for performing speaker identification, computing system may take into account varying acoustic conditions within audio dataset 104. In some examples, computing system 102 predicts speaker identification performance for each audio segment of audio dataset 104, providing reliability scores based on the information content of each segment. Although computing system 102 is configured to predict speaker identification performance, the techniques described herein may apply to one or more other speech technologies such as audio editing and audio enhancement.

A score indicating reliability of an audio segment for performing speaker identification may indicate a likelihood that computing system 102 is configured to accurately perform speaker identification using the audio segment. That is, computing system 102 may be configured to identify a human speaker associated with an audio sample at a high degree of confidence when the audio sample has a high reliability score. Alternatively, computing system 102 may identify a human speaker associated with an audio sample at a low degree of confidence when the audio sample has a low reliability score. In other words, computing system 102 may correctly identify a human speaker associated with high-reliability audio samples more frequently than computing system 102 correctly identifies a human speaker associated with low-reliability audio samples.

Feature extraction model 122 may be configured to extract, for each audio segment of a sequence of audio segments of the audio dataset 104, a set of audio feature values corresponding to a set of audio features, wherein each audio feature value of the set of audio feature values indicates a prevalence of an audio feature of the set of audio features corresponding to the respective audio segment of the sequence of audio segments. In some examples, one or more features of the set of audio features are speaker-extrinsic, such as a noise level in the recording environment of audio dataset 104. Speaker-extrinsic features may represent one or more features of the recording that are not related to speech recorded in the audio dataset 104. For example, the level of noise in the recording environment may be present when a speaker is speaking and when a speaker is not speaking, meaning that the level of noise in the recording environment does not depend on the speech recorded in audio dataset 104. In some examples, the set of features may include one or more speaker-intrinsic features, such as a category of sounds that are part of speech recorded in audio dataset 104. Speaker-intrinsic features represent features that are related to the recorded speech itself.

Since both speaker-extrinsic features and speaker-intrinsic features may vary throughout the course of a recording, it may be beneficial for feature extraction model 122 to extract the set of audio feature values from each audio segment of the sequence of audio segments of audio dataset 104, In some examples, the set of audio feature values corresponding to each audio segment of the sequence of audio segments may indicate the reliability of the respective audio segment for performing speaker identification. In some examples, each audio feature of the set of audio features may affect whether a segment of audio data is useful for performing speaker identification. It may be beneficial for computing system 102 to identify the set of audio features that are most predictive of audio data being useful for speaker identification, and extract audio feature values corresponding to these features. 100341 in some examples, the set of audio features may include cycle-to-cycle changes in amplitude (e.g., shimmer), cycle-to-cycle changes in frequency (e.g., jitter), signal-to-noise ratio (SNR), harmonics-to-noise ratio (HNR), degradation due to reverberation, emotional valence, level of speech activity, mean voicing probability, autocorrelation peak, mean spectral tilt, standard deviation of spectral tilt, or any combination thereof. The techniques of this disclosure are not limited to these audio features. Feature extraction model 122 may additionally or alternatively extract feature values corresponding to one or more other audio features. In some examples, the set of audio features may include one or more features that represent a combination of two or more other features of the set of audio features. For example, the set of audio features may include a combination feature comprising a sum of shimmer and jitter.

Feature extraction model 122 may extract audio feature values for one or more audio features using signal processing techniques. For example, feature extraction model 122 may use signal processing techniques to determine shimmer, jitter, SNR, and HNR. In some examples, an audio speech recording may include a set of audio cycles. A frequency of the audio cycles may determine a pitch of the audio, and an amplitude of the audio cycles may indicate a loudness of the speech. Shimmer may represent a variance of the amplitude of the set of audio cycles of an audio segment, and jitter may represent a variance of the frequency of the set of audio cycles. Shimmer and jitter may represent important features for identifying a reliability of an audio sample for speaker identification. In some examples, lower values of shimmer and jitter, that is lower amounts of variance in amplitude and frequency of audio cycles, may indicate higher reliability for speaker identification as compared with higher values of shimmer and jitter.

SNR may represent a ratio of an amplitude of a speech signal to an amplitude of background noise within an audio signal. An audio segment having a high SNR may have a better reliability for speaker identification as compared with an audio segment having a low SNR. HNR may represent a ratio between a periodic component of an audio signal and a non-periodic component of an audio signal. In some examples, the periodic component of an audio signal corresponds to a vibration of the vocal cords, and the non-periodic component of an audio signal corresponds to glottal noise. A high HNR may indicate a high efficiency of converting airflow in the respiratory tract to vibration of vocal cords. Consequently, an audio segment having a high HNR may have a better reliability for speaker identification as compared with an audio segment having a low HNR.

Feature extraction model 122 may extract audio feature values for one or more audio features using specialized feature extraction machine learning models. For example, feature extraction model 122 may include a speech activity detection (SAD) machine learning model for determining a level of speech activity, also referred to as "speachiness," within an audio sample. Since it is important to identify portions of an audio dataset 104 where the subject is actually speaking in order to perform speaker identification, it may be beneficial to use a machine learning model to determine a level of speech activity corresponding to each audio segment of the audio dataset 104.

The SAD machine learning model of feature extraction model 122 may be configured to generate a speech activity audio feature value corresponding to each audio segment of the sequence of audio segments of audio dataset 104. In some examples, the speech activity audio feature value corresponding to each audio segment of the sequence of audio segments may indicate a reliability of the respective audio segment for identifying a speaker associated with the audio segment. In some examples, a speech processing model may be able to more reliably identify a speaker corresponding to a first audio segment having higher level of speech activity as compared with a reliability of the speech processing model in identifying a speaker of a second audio segment associated with a lower level of speech activity.

In some examples, the SAD machine learning model of feature extraction model 122 comprises a deep neural network (DNN). The DNN may, in some cases, include a first hidden layer comprising 500 nodes and a second hidden layer comprising and 100 nodes, but this is not required. The DNN may include any number of layers each having any number of nodes. In some examples, computing system 102 executes processing circuitry 112 to train the SAD machine learning model of feature extraction model 122 using mel-frequency cepstral coefficient (MFCC) features each having twenty dimensions, stacked with 31 frames. Before training the SAD machine learning model, processing circuitry 112 may mean and variance normalize the MFCC features over a window having 201 frames. An output from the SAD machine learning model may be smoothed using a 0.5 second window. One or more speech segments detected using the SAD machine learning model may, in some cases, be padded by a third of a second. For each audio segment of the sequence of audio segments corresponding to audio dataset 104, SAD machine learning model may be configured to output a mean speech activity log-likelihood ratio (LLR), and median speech activity LLR, a mean number of speech activity LLRs greater than 0, mean number of speech activity LLRs greater than 0.5, mean number of speech activity LLRs greater than 1, or any combination thereof.

Feature extraction model 122 may be configured to extract values for one or more audio features useful for speaker identification that represent properties of source harmonics, such as HNR, or properties of how source harmonics are filtered (e.g., vocal tract resonances). In some examples, it may be more difficult for feature extraction model 122 to extract audio features that represent properties of source harmonics from audio data corresponding to unvoiced speech than it is difficult for feature extraction model 122 to extract these features from audio data corresponding to voiced speech. Consequently, audio segments containing a greater amount of voiced speech than unvoiced speech may be more reliable for performing speaker identification as compared with audio segments containing a greater amount of unvoiced speech than voiced speech. In some examples, voiced speech occurs when the speaker's vocal cords vibrate in communicating one or more words or other sounds and unvoiced speech occurs when the speaker's vocal cords do not vibrate.

Feature extraction model 122 may be configured to extract values for one or more audio features that indicate a level of voicing present in an audio sample. For example, feature extraction model 122 may extract a mean voicing probability score corresponding to each audio segment of the sequence of audio segments. A mean voicing probability score may represent a binary score indicating whether voicing is likely present in the audio segment or whether voicing is not likely present in the audio segment. Feature extraction model 122 may extract a mean autocorrelation peak corresponding to each audio segment of the sequence of audio segments. In some examples, a mean autocorrelation peak may represent a measure of periodicity of the respective audio segment, and therefore indicates a level of voicing. Audio data with a greater amount of periodicity may include more voicing that audio data with a lower amount of periodicity.

Mean spectral tilt and standard deviation of spectral tilt also represent audio features that indicate a level of voicing in an audio segment. Feature extraction model 122 may extract, from each audio segment of the sequence of audio segments corresponding to audio dataset 104, an audio feature value corresponding to mean spectral tilt and an audio feature value corresponding to a standard deviation of spectral tilt. Spectral tilt is a phenomenon that occurs when a speaker raises and lowers their voice. When a speaker increases their voice, this causes a higher airflow through the glottis. This means that the change in airflow when the glottis closes is greater at higher speaking volume as compared with lower speaking volume. Standard deviation of spectral tilt may indicate audio segments that contain anomalies such as a prolonged vowel, which may provide less value for speaker identification as compared with audio segments that have two or more syllables. A higher standard deviation in spectral tilt may suggest a larger variety of speech segments that might paint a fuller picture of a speaker's voice.

Processing circuitry 112 may execute audio reliability machine learning model 124 in order to determine, for each audio segment of the sequence of audio segments corresponding to audio dataset, a reliability score based on the set of audio feature values corresponding to the respective audio segment, wherein the reliability score indicates a reliability of the audio segment for performing speaker identification. In some examples, the reliability of an audio segment for performing speech processing may correspond to a probability that a speech processing model is configured to correctly identify a speaker corresponding to the audio segment. For example, a probability that speech processing model 126 is able to correctly identify a speaker corresponding to an audio segment that is associated with a first value for speaker identification is higher than a probability that speech processing model 126 is able to correctly identify a speaker corresponding to an audio segment that is associated with a second value for speaker identification when the first value is higher than the second value.

Audio reliability machine learning model 124 may be configured to distinguish audio data that is reliable for speech processing techniques (e.g., speaker identification) from audio that might not be reliable for one or more speech processing techniques. That is, audio reliability machine learning model 124 may be configured to identify audio data that is likely to produce an accurate speaker identification from audio data that is likely to produce an erroneous speaker identification. There may be a high level of variability in reliability of an audio dataset for speaker identification. For example, some portions of an audio dataset may be more reliable for speaker identification and some portions of an audio dataset may be less reliable for speaker identification. Classifying a reliability of an entire audio dataset for speaker identification without classifying different portions of the audio dataset may, in some examples, result in the system 100 performing speaker identification using unreliable segments of an audio dataset, or, alternatively, rejecting reliable portions of an audio dataset. For example, an audio dataset including high levels intermittent traffic noise in some portions of the dataset and low levels of noise in other portions may be more reliable for speaker identification the low-noise portions. By identifying the portions of audio dataset 104 that are most reliable for speaker identification, audio reliability machine learning model 124 may cause computing system 102 to produce more accurate speaker identifications as compared with systems that do not analyze a reliability of different portions of an audio dataset for speaker identification.

Audio reliability machine learning model 124 may combine supervised learning with one or more intelligent features. For example, since feature extraction model 122 may extract a set of audio feature values from audio dataset 104. In some examples, some of the audio feature values are speaker-extrinsic, such as noise level in the recording environment, and some of the audio feature values are speech/speaker-intrinsic, such as the different kinds of speech sounds that an audio segment may contain. Audio reliability machine learning model 124 may couple the set of audio feature values with a time domain confidence model such that performance is predicted for each audio segment of the sequence of audio segments because conditions can vary throughout an audio file. Audio reliability machine learning model 124 may be configured to identify a relationship between a prevalence of one or more audio features values in audio data and the performance of the speech processing model 126. Audio reliability machine learning model 124 may use this relationship to characterize audio data with a confidence value. The confidence value may indicate a confidence that speech processing model 126 will accurately identify a particular human speaker associated with audio data.

In some examples, audio reliability machine learning model 124 may generate a confidence value indicating a degree of confidence that speech processing model 126 will correctly identify a particular human speaker corresponding to audio dataset 104. For example, audio reliability machine learning model 124 may generate a confidence value based on the sets of audio feature values corresponding to one or more audio segments selected for input to speech processing model 126, a number of audio segments selected for input to speech processing model 126, a mean reliability score corresponding to one or more audio segments selected for input to speech processing model 126, a median reliability score corresponding to one or more audio segments selected for input to speech processing model 126, or any combination thereof. This means that audio reliability machine learning model 124 is configured to both identify the highest-reliability portions of audio sample 104 for speaker identification, and also determine a confidence that speech processing model 126 will correctly identify a particular human speaker associated with audio dataset 104 that is comparable to a confidence that speech processing model 126 will correctly identify a particular human speaker associated with one or more other audio datasets.

Processing circuitry 112 may identify, based on reliability score corresponding to each audio segment of the sequence of audio segments of audio dataset 104, one or more audio segments of the sequence of audio segments that are most valuable for performing speaker identification. For example, processing circuitry 112 may identify the one or more audio segments of the sequence of audio segments that have the highest reliability scores. To identify the one or more audio segments of the sequence of audio segments that have the highest reliability scores, processing circuitry 112 may, in some examples, identify whether the reliability score corresponding to each audio segment of the sequence of audio segments is greater than a reliability score threshold and select the one or more audio segments to include every segment including a reliability score higher than the reliability score threshold. In some examples, processing circuitry 112 may rank the reliability score corresponding to each audio segment of the sequence of audio segments. Processing circuitry 112 may identify the one or more audio segments of the sequence of audio segments that have the highest reliability scores by selecting an optionally configurable, predetermined percentage or number of audio segments from the sequence of audio segments that have the highest reliability scores. Processing circuitry 112 may be configured to store, in the storage device(s) 114, the one or more audio segments of the sequence of audio segments that are most valuable for performing speaker identification.

In some examples, audio dataset 104 may, include speech from an unknown human speaker. That is, audio dataset 104 may include speech from a human speaker that has not been identified as being speech from a particular human speaker. Processing circuitry 112 may, in some examples, be configured to execute speech processing model 126 to process the one or more audio segments of the sequence of audio segments that are most valuable for performing speaker identification to determine a probability that the speech from the unknown human speaker represents speech from a particular human speaker. In some examples, speech processing model 126 may be configured to output the probability that the speech from the unknown human speaker present in audio dataset 104 represents speech from a particular human speaker as part of output 106. In some examples, processing circuitry 112 may be configured to save the probability that the speech from the unknown human speaker present in audio dataset 104 represents speech from a particular human speaker to storage device(s) 114.

Audio reliability machine learning model 124 may comprise an artificial neural network (ANN), a convolutional neural network (CNN), a recurrent neural network (RNLI), a deep neural network (DNN), or any combination thereof. In some examples, machine learning may be configured to perform supervised learning. Processing circuitry 112 may be configured to train audio reliability machine learning model 124 using training data 150. In some examples, to train audio reliability machine learning model 124, processing circuitry 112 may identify, based on the training data 150, the set of audio features that are extracted from audio dataset 104 to include features that are correlated (positively or negatively) with a reliability or value of audio data for speaker identification.

Training data 150 may, in some examples, include a plurality of training audio datasets known to include speech from a particular speaker. That is, each set of training audio datasets of the one or more sets of training audio datasets may be known to include speech from a particular human speaker. To train audio reliability machine learning model 124, processing circuitry 112 may be configured to execute feature extraction model 122 and speech processing model 126 to perform a plurality of determinations, wherein each determination of the plurality of comparisons involves determining whether an audio segment of a training audio dataset present in training data 150 includes speech from a particular human speaker that is known to correspond to the audio segment. In some examples, the particular human speaker may be referred to herein as a "target class."

In some examples, to train audio reliability machine learning model 124, processing circuitry 112 may identify a sequence of audio segments corresponding each training audio dataset of the plurality of training audio datasets. That is, processing circuitry 112 may be configured to identify a sequence of audio segments corresponding to both audio dataset 104 and the sequence of audio segments. Processing circuitry 112 may execute speech processing model 126 to determine, for each training audio dataset of the plurality of training audio datasets, whether each audio segment of the respective sequence of audio segments includes speech from a particular human speaker known to be associated with the respective training audio dataset. In some examples, speech processing model 126 may determine a probability that each audio segment of the respective sequence of audio segments includes speech from a particular human speaker known to be associated with the respective training audio dataset of training data 150. Processing circuitry 112 may save, for each training audio dataset of the plurality of training audio datasets in storage device(s) 114, the probability that each audio segment of the respective sequence of audio segments includes speech from the particular human speaker known to be associated with the respective training audio dataset.

Processing circuitry 112 may evaluate, based on the particular human speaker known to be associated with each training audio dataset of the plurality of training audio datasets, each determination made by speech processing model 126 corresponding to training data 150. In some examples, for each determination made by speech processing model 126, processing circuitry 112 may determine whether speech processing model 126 correctly determined whether an audio segment comprises speech from the particular human speaker known to be associated with the respective training data audio sample. If speech processing model 126 correctly determined that an audio segment comprises speech from the particular human speaker known to be associated with the respective training data audio sample, processing circuitry 112 may identify the determination as a high-quality determination. If speech processing model 126 incorrectly determined that an audio segment does not include speech from the particular human speaker known to be associated with the respective training data audio sample, processing circuitry 112 may identify the determination as a low-quality determination. In some examples, processing circuitry 112 may save data to storage device(s) 114 indicating whether each determination made by the speech processing model 126 is correct or incorrect.

In some examples, for each determination made by speech processing model 126, processing circuitry 112 may compare the determined probability that an audio segment comprises speech from the particular human speaker known to be associated with the respective training data audio sample with the reality of the particular human speaker known to be associated with the respective training data audio sample. For example, if the speech processing model 126 determined that there is a 95% probability that an audio segment comprises speech from a particular human speaker and the particular human speaker is known to be associated with the audio segment, processing circuitry 112 may determine that speech processing model 126 made a high-quality determination. But if the speech processing model 126 determined that there is a 23% probability that an audio segment comprises speech from a particular human speaker and the particular human speaker is known to be associated with the audio segment, processing circuitry 112 may determine that speech processing model 126 made a low-quality determination. In some examples, processing circuitry 112 may save data to storage device(s) 114 indicating, for each probability determined by speech processing model 126, a comparison between the probability and a reality of the particular human speaker associated with the respective training data audio sample.

To train audio reliability machine learning model 124, processing circuitry 112 may determine, based on one or more high-quality determinations made by speech processing model 126 corresponding to training data 150 and one or more low-quality determinations made by speech processing model 126, a set of audio features present in audio data that predict whether speech processing model 126 produces a high-quality speaker identification determination or a low-quality speaker identification determination, Processing circuitry 112 may be configured to determine an extent to which each audio feature of a plurality of audio features is present in an audio segment of a training audio dataset. Processing circuitry 112 may determine, based on the extent to which each audio feature of a plurality of audio features is present in each audio segment of training data 150 and based on a quality of a speaker identification determination corresponding to each audio segment of training data 150, the set of audio features that feature extraction model 122 extracts from audio dataset 104 for input to audio reliability machine learning model 124.

In some examples, to select the set of audio features for input to audio reliability machine learning model 124, processing circuitry 112 may determine a correlation coefficient corresponding to each audio feature of a plurality of audio features present in training data 150. In some examples, the correlation coefficient may represent Pearson's correlation coefficient, but this is not required. The correlation coefficient may represent any kind of coefficient that indicates a correlation between the prevalence of the audio feature and a quality of speaker identification produced by speech processing model 126. In some examples, to determine a correlation coefficient corresponding to an audio feature, processing circuitry 112 may determine a prevalence of the audio feature in a plurality of audio segments of training data. Processing circuitry 112 may determine whether a linear relationship exists between the prevalence of the audio feature in an audio segment and a rate at which speech processing model 126 produces a high-quality speaker identification. If a linear relationship exists, the slope of the linear relationship may represent a correlation coefficient. In some examples, a higher correlation coefficient indicates that an audio feature is more predictive of speaker identification quality and a lower correlation coefficient indicates that an audio feature is less predictive of speaker identification quality.

Based on determining the set of audio features present in audio data that predict whether speech processing model 126 produces a high-quality speaker identification determination or a low-quality speaker identification determination, processing circuitry 112 may train audio reliability machine learning model 124 to accept values for each audio feature of the set of audio features and generate an output indicating a reliability score. In some examples, processing circuitry 112 may train audio reliability machine learning model 124 based on a correlation coefficient corresponding to each audio feature of the set of audio features. That is, if a first audio feature is more correlated with high-quality speaker identification that a second audio feature, processing circuitry 112 may train audio reliability machine learning model 124 to consider this difference in correlation in generating the reliability score.

Figure 2:
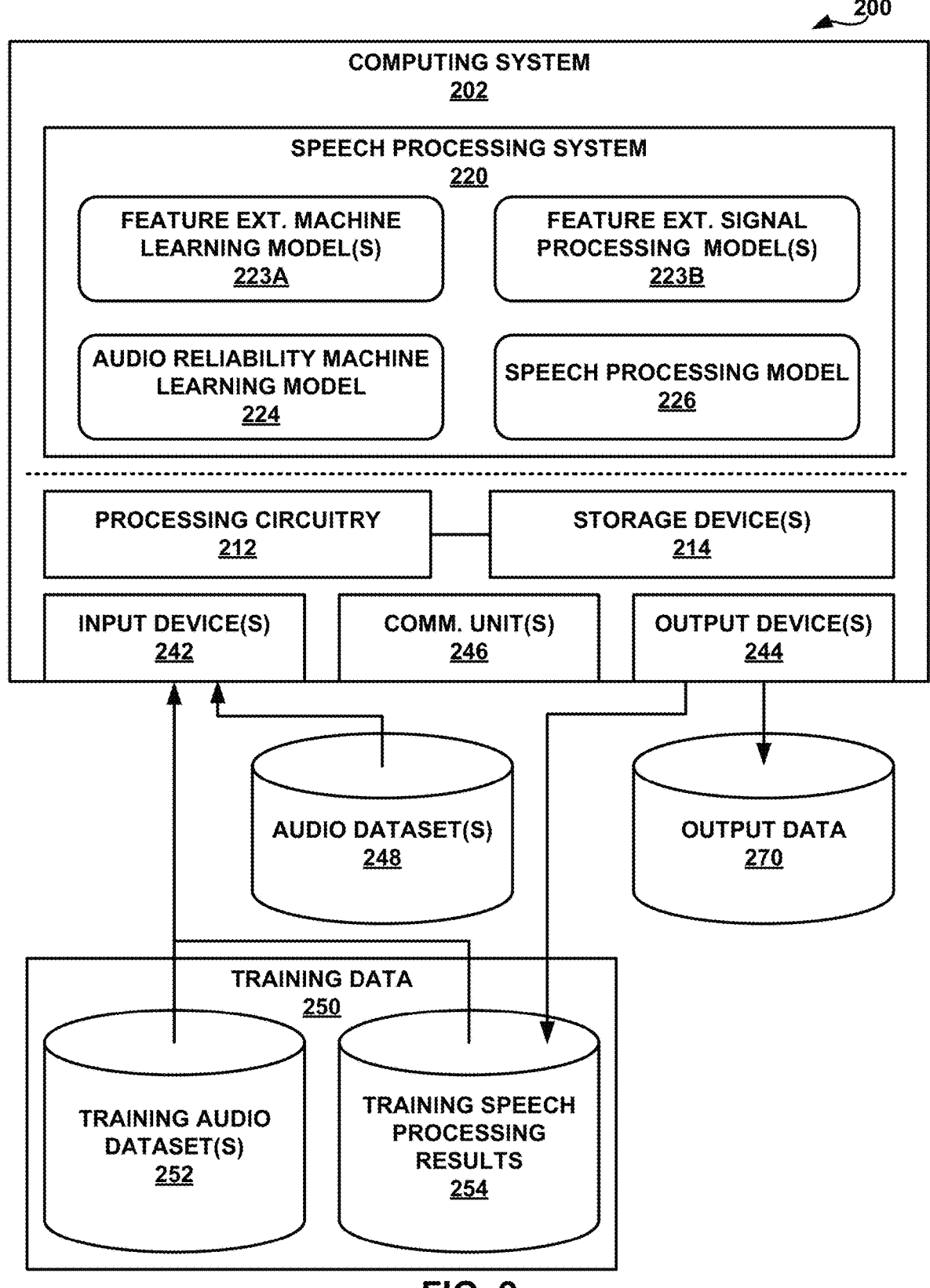
FIG. 2 is a block diagram illustrating a system including an example computing system that implements a speech processing system to identify portions of an audio dataset that are most valuable for performing speech processing, in accordance with one or more techniques of this disclosure.

FIG. 2 is a block diagram illustrating a system 200 including an example computing system 202 that implements a speech processing system 220 to identify portions of an audio dataset that are most valuable for performing speech processing, in accordance with one or more techniques of this disclosure. As seen in FIG. 2, system 200 includes computing system 202. Computing system 202 includes processing circuitry 212, storage device(s) 214, and speech processing system 220 including feature extraction machine learning model(s) 223A, feature extraction signal processing model(s) 223B, audio reliability machine learning model 224, and speech processing model 226. Computing system 202 also includes input device(s) 242, communication unit(s) 246, and output device(s) 244. System 200 also includes audio dataset(s) 248, training data 250 including training audio datasets 252 and training speech processing results 254, and output data 270.

System 200 may be an example of system 100 of FIG. 1. Computing system 202 may be an example of computing system 102 of FIG. 1. Processing circuitry 212 may be an example of processing circuitry 112 of FIG. 1. Storage device(s) 214 may be an example of storage device(s) 114 of FIG. 1. Feature extraction machine learning model(s) 223A and feature extraction signal processing model(s) 223B may be examples of feature extraction model 122 of FIG. 1. Audio reliability machine learning model 224 may be an example of audio reliability machine learning model 124 of FIG. 1. Speech processing model 226 may be an example of speech processing model 126 of FIG. 1. Audio dataset(s) 248 may include audio dataset 104 of FIG. 1. Output data 270 may include output 106 of FIG. 1.

One or more input device(s) 242 of computing system 202 may generate, receive, or process input. Such input may include input from storage device(s) 214, a keyboard, pointing device, voice responsive system, video camera, biometric detection/response system, button, sensor, mobile device, control pad, microphone, presence-sensitive screen, network, or any other type of device for detecting and/or receiving input from a human or machine.

One or more output device(s) 244 of computing system 202 may generate, transmit, or process output. Examples of output are tactile, audio, visual, and/or video output. Output devices 244 may include a display, sound card, video graphics adapter card, speaker, presence-sensitive screen, one or more USB interfaces, video and/or audio output interfaces, or any other type of device capable of generating tactile, audio, video, or other output. Output device(s) 244 may include a display device, which may function as an output device using technologies including liquid crystal displays (LCD), quantum dot display, dot matrix displays, light emitting diode (LED) displays, organic light-emitting diode (OLEIC) displays, cathode ray tube (CRT) displays, e-ink, or monochrome, color, or any other type of display capable of generating tactile, audio, and/or visual output. In some examples, computing system 100 may include a presence-sensitive display that may serve as a user interface device that operates both as one or more input device(s) 242 and one or more output device(s) 244.

One or more communication unit(s) 246 of computing system 100 may communicate with devices external to computing system 202 (or among separate computing devices of computing system 202) by transmitting and/or receiving data and may operate, in some respects, as both an input device and an output device. In some examples, communication unit(s) 246 may communicate with other devices over a network. In other examples, communication unit(s) 246 may send and/or receive radio signals on a radio network such as a cellular radio network. Examples of communication unit(s) 246 include a network interface card (e.g. such as an Ethernet card), an optical transceiver, a radio frequency transceiver, a GPS receiver, or any other type of device that can send and/or receive information. Other examples of communication unit(s) 246 may include Bluetooth®, GPS, 3G, 4G, and Wi-Fi® radios found in mobile devices as well as Universal Serial Bus (USB) controllers and the like. Computing system 202 may use communication unit(s) 246 to communicate with one or more other computing devices or systems. Communication unit(s) 246 may be included in a single device or distributed among multiple devices interconnected, for instance, via a computer network coupled to communication unit(s) 246. Reference herein to input devices and output devices may refer to communication unit(s) 246.

Computing system 202 may be configured to receive data via input device(s) 242. For example, computing system 202 may receive one or more audio dataset(s) 248 via input device(s) 242. Audio dataset(s) 248 may, in some examples, include audio dataset 104 of FIG. 1. In some examples, one or more audio datasets of audio dataset(s) 248 may include speech from a human speaker. In some examples, a human speaker corresponding to one or more audio datasets of audio dataset(s) 248 may be unknown. In some examples, a human speaker corresponding to one or more audio datasets of audio dataset(s) 248 may be suspected but not verified to be a particular human speaker. In any case, computing system may be configured to process each audio dataset of audio dataset(s) 248 to identify a particular human speaker corresponding to each audio dataset of audio dataset(s) 248.

Computing system 202 may be configured to receive training data 250 via input device(s) 242. As seen in FIG. 2, training data 250 includes training audio dataset(s) 252 and training speech processing results 254. In some examples, computing system 202 saves training data 250 to storage device(s) 214. In some examples, training data 250 updates over time, and computing system 202 saves updated training data to storage device(s) 214. For example, computing system 202 may receive additional training audio dataset(s) 252. Computing system 202 may augment training audio dataset(s) 252 saved to storage device 214 when computing system 202 receives additional training data via input device(s) 242.

In some examples, computing system 202 may receive an audio dataset of audio dataset(s) 248 via input device(s) 242. In some examples, the audio dataset may comprise a sequence of audio segments. Each audio segment of the sequence of audio segments may follow a preceding audio segment of the sequence of audio segments. For example, each audio segment of the sequence of audio segments may correspond to the audio dataset over a window of time beginning at a first time and ending at a second of time. In some examples, the first time representing a start of an audio segment of the sequence of audio segments may occur at a second time representing an end of a preceding audio segment of the sequence of audio segments, and the second time representing the end of the audio segment of the sequence of audio segments may occur at a first time representing a start of a subsequent audio segment of the sequence of audio segments. In some examples, each audio segment of the sequence of audio segments may have a duration equal to each other audio segment of the sequence of audio segments. In some examples, each audio segment of the sequence of audio segments may have a duration equal to two seconds, but this is not required. Audio segments may have durations equal to any amount of time.

Computing system 202 may execute feature extraction machine learning model(s) 223A and feature extraction signal processing models) 223B (collectively, feature extraction model(s) 223) may extract, for each audio segment of the sequence of audio segments of the audio dataset, a set of audio feature values. Each audio feature value of the set of audio feature values may correspond to an audio feature of a set of audio features. In some examples, each audio feature value of the set of audio feature values indicates a prevalence of the respective audio feature of the set of audio features.

In some examples, the set of audio features may include shimmer, jitter, signal-to-noise ratio (SNR), harmonics-to-noise ratio (HNR), degradation due to reverberation, cycle-to-cycle changes in amplitude, cycle-to-cycle changes in frequency, emotional valence, level of speech activity, mean voicing probability, autocorrelation peak, mean spectral tilt, standard deviation of spectral tilt, or any combination thereof. The techniques of this disclosure are not limited to these audio features. Feature extraction model 122 may additionally or alternatively extract feature values corresponding to one or more other audio features. In some examples, the set of audio features may include one or more features that represent a combination of two or more other features of the set of audio features. For example, the set of audio features may include a combination feature comprising a sum of shimmer and jitter.

Feature extraction machine learning model(s) 223A may extract one or more audio feature values of the set of audio feature values. For example, feature extraction machine learning model(s) 223A may extract values for mean voicing probability, level of speech activity, emotional valence, autocorrelation peak, mean spectral tilt, and standard deviation of spectral tilt. In some examples, feature extraction machine learning model(s) 223A may extract one or more audio feature values that require more than basic signal processing techniques to determine. Since audio features relating to characteristics of a speaker's voice (e.g., voicing) may be more difficult to extract that audio features that can be extracted using signal processing techniques (e.g., SNR, HNR), computing system 202 may train feature extraction machine learning model(s) 223A to extract these audio features.

Feature extraction signal processing model(s) 223B may extract one or more audio feature values of the set of audio feature values. For example, feature extraction signal processing model(s) 223B may extract audio feature values for shimmer, jitter, SNR, degradation due to reverberation, cycle-to-cycle changes in amplitude, and cycle-to-cycle changes in frequency. In some examples, feature extraction signal processing model(s) 223B may extract audio feature values corresponding to values of common signal characteristics such as frequency and amplitude.

Processing circuitry 212 may be configured to execute audio reliability machine learning model 224 to determine, for each audio segment of the sequence of audio segments corresponding to the audio dataset received from audio dataset(s) 248, a reliability score based on the set of audio feature values corresponding to the respective audio segment. That is, audio reliability machine learning model 224 may determine a reliability of each audio segment of the sequence of audio segments for performing one or more speech processing techniques such as speaker identification. Speaker-extrinsic and speaker-intrinsic audio features may vary throughout an audio dataset. For example, background noise may increase and/or decrease throughout a recording, affecting a reliability for performing speaker identification. Furthermore, a nature of the speech itself may improve and/or worsen throughout a recording. For example, a speaker may transition from clear spoken words to guttural sounds, thus affecting reliability for performing speaker identification. In any case, it may be beneficial for audio reliability machine learning model 224 to determine a reliability score for each audio segment of the sequence of audio segments in order to identify the highest reliability portions of the audio dataset for identifying a speaker corresponding to the audio dataset.

Processing circuitry 212 may, in some examples, be configured to identify, based on the reliability score corresponding to each audio segment of the sequence of audio segments of the audio dataset, one or more audio segments of the sequence of audio segments that are most valuable for performing speaker identification. In some examples, the one or more audio segments of the sequence of audio segments that are most valuable for performing speaker identification comprise each audio segment having a reliability score that is greater than a reliability score threshold. In some examples, the one or more audio segments of the sequence of audio segments that are most valuable for performing speaker identification comprise a predetermined number of audio segments or a predetermined percentage of a total number of the sequence of audio segments that represent the highest reliability scores. Processing circuitry 212 may be configured to store the one or more audio segments of the sequence of audio segments that are most valuable for performing speaker identification in the storage device(s) 214.

In some examples, the audio dataset that computing system 202 receives from audio dataset(s) 248 via input device(s) 242 includes speech from a human speaker. In some examples the human speaker associated with the audio dataset may be unknown. In some examples, computing system 202 may operate under a hypothesis that the audio dataset includes speech from a particular human speaker, and computing system 202 may be configured to generate an output verifying whether the audio dataset includes speech from the particular human speaker. Processing circuitry 212 is configured to execute speech processing model 226 to determine, based on the one or more audio segments of the sequence of audio segments of the audio dataset that are most valuable for performing speaker identification, whether the human speaker corresponding to the audio dataset is a particular human speaker.

By using speech processing model 226 to determine whether a human speaker corresponding to the audio dataset is a particular human speaker based on the one or more audio segments of the audio dataset that are most valuable for speaker identification, computing system 202 may improve an accuracy at which speech processing system 220 is configured to perform speaker identification as compared with systems that do not identify portions of an audio file that are most valuable for speaker identification. Furthermore, by using feature extraction models 223 to extract a set of audio feature values corresponding to audio features that are correlated with audio reliability for speaker identification, computing system 202 may improve an ability of audio reliability machine learning model 224 to determine a reliability score for an audio segment as compared with systems that do not extract values for audio features that predict a reliability of audio data for speaker identification.

Processing circuitry 212 may store, in the storage device 214, information indicating whether human speaker corresponding to the audio dataset is the particular human speaker, Additionally, or alternatively, processing circuitry 212 may be configured to output, via output device(s) information indicating whether a human speaker corresponding to the audio dataset is the particular human speaker to output data 270. In some examples, processing circuitry 212 may be configured to output the information indicating whether a human speaker corresponding to the audio dataset is the particular human speaker with a confidence value. In some examples, the confidence value may indicate a confidence that the information including the speaker identification is correct. In some examples, audio reliability machine learning model 224 may calculate the confidence value based on the set of audio feature values extracted by feature extraction models 223.

Processing circuitry 212 may be configured to train feature extraction machine learning models) 223A based on one or more of training audio dataset(s) 252 received via input device(s) 242. In some examples, one or more of feature extraction machine learning model(s) 223A may comprise a DNN. The DNN may, in some cases, include a first hidden layer comprising 500 nodes and a second hidden layer comprising and 100 nodes, but this is not required. The DNN may include any number of layers each having any number of nodes. In some examples, processing circuitry 112 trains the DNN using MFCC features each having twenty dimensions, stacked with 31 frames. Before training the DNN, processing circuitry 212 may mean and variance normalize the MFCC features over a window having a number of frames. In some examples, the number of frames may be 201 frames, but this is not required. The number of frames may be any number of frames.

An output one or more of feature extraction machine learning model(s) 223A may be smoothed using a window having a predetermined duration (e.g., a 0.5 second window), In some examples, the one or more of feature extraction machine learning model(s) 223A may include an SAD machine learning model. One or more speech segments detected using the SAD machine learning model may, in some cases, be padded by an amount of time (e.g., ⅓ second). For each audio segment of the sequence of audio segments corresponding to the audio dataset received via input device(s) 242, the SAD machine learning model may be configured to output a mean speech activity LLR, a median speech activity LLR, a mean number of speech activity LLRs greater than 0, a mean number of speech activity LLRs greater than 0.5, a mean number of speech activity LLRs greater than 1, or any combination thereof.

Processing circuitry 212 may be configured to train audio reliability machine learning model 224. In some examples, processing circuitry 212 is configured to train audio reliability machine learning model based on training audio dataset(s) 252 and training speech processing results 254 of training data 250, Each training audio dataset of training audio dataset(s) 252 may be known to include speech from a particular human speaker. That is, training data 250 may include information indicating the particular human speaker corresponding to each training audio dataset of training audio dataset(s) 252.

In some examples, each training audio dataset of training audio dataset(s) 252 may comprise a sequence of audio segments, Each audio segment of the sequence of audio segments may follow a preceding audio segment of the sequence of audio segments. For example, each audio segment of the sequence of audio segments of may correspond to the respective training audio dataset over a window of time beginning at a first time and ending at a second of time. In some examples, the first time representing a start of an audio segment of the sequence of audio segments may occur at a second time representing an end of a preceding audio segment of the sequence of audio segments, and the second time representing the end of the audio segment of the sequence of audio segments may occur at a first time representing a start of a subsequent audio segment of the sequence of audio segments. In some examples, each audio segment of the sequence of audio segments may have a duration equal to each other audio segment of the sequence of audio segments. In some examples, each audio segment of the sequence of audio segments may have a duration equal to two seconds, but this is not required. Audio segments may have durations equal to any amount of time.

To train audio reliability machine learning model 224, processing circuitry 212 is configured to execute speech processing model 226 to determine, for each training audio dataset of training audio dataset(s) 252, whether each audio segment of the respective sequence of audio segments corresponds to a particular human speaker. Since training data 250 includes information indicating a particular human speaker known to correspond to each training audio dataset of training audio dataset(s) 252, computing system 202 may be able to determine an accuracy at which speech processing model 226 identified the human speaker associated with each audio segment of training audio dataset(s) 252.

For example, computing system 202 may determine, for each audio segment of training audio dataset(s) 252 analyzed by speech processing model 226, an extent to which speech processing model 226 accurately identified the particular human speaker associated with the respective audio segment. For example, when the speech processing model 226 determines that there is a 95% probability that an audio segment from training audio dataset(s) 252 comprises speech from a particular human speaker and the particular human speaker is known to be associated with the audio segment based on training data 250, processing circuitry 212 may determine that speech processing model 226 made a high-quality determination. But if the speech processing model 226 determined that there is a 23% probability that an audio segment from training audio dataset(s) 252 comprises speech from a particular human speaker and the particular human speaker is known to be associated with the audio segment, processing circuitry 112 may determine that speech processing model 126 made a low-quality determination.

In some examples, processing circuitry 212 may determine a quality score for every occasion where speech processing model 226 determines whether an audio sequence of training audio dataset(s) 252 includes speech from a particular human speaker. In some examples, the quality score may range from 0 (lowest quality) to 1 (highest quality). Processing circuitry 112 may save the quality score corresponding to each occasion where speech processing model 226 determines whether an audio sequence of training audio dataset(s) 252 includes speech from a particular human speaker to storage device(s) 214. In some examples, processing circuitry 112 may output the quality score corresponding to each occasion where speech processing model 226 determines whether an audio sequence of training audio dataset(s) 252 includes speech from a particular human speaker to training speech processing results 254 via output device(s) 244.

This means that training speech processing results 254 may include a plurality of quality scores, Each quality score of the plurality scores indicates a quality of a speaker identification performed by speech processing model 226 corresponding to a respective audio segment of a training audio dataset of training audio dataset(s) 252, Since processing circuitry 212 is configured to determine whether speech processing model 226 correctly identifies a human speaker associated with training data, it may be beneficial for processing circuitry 212 to identify one or more characteristics of training data that speech processing model 226 is able to correctly identify a speaker.

To train audio reliability machine learning model 224, processing circuitry 212 may be configured to identify the set of audio features that audio reliability machine learning model 224 accepts as inputs based on the training speech processing results 254. For example, based on training speech processing results 254, processing circuitry 212 may identify a correlation coefficient corresponding to each audio feature of a plurality of audio features. The correlation coefficient may indicate an extent to which the respective audio feature is correlated with whether speech processing model 226 generates a high-quality speaker identification for audio segments including the audio feature. Processing circuitry 212 may be configured to identify the set of audio features to include the audio features of the plurality of audio features that have the highest correlation coefficients. Processing circuitry 212 may train audio reliability machine learning model 224 based on the selected set of audio features and the correlation coefficient associated with each audio feature of the set of audio features.

Although in the example of FIG. 2, computing system 202 is configured to both train and execute audio reliability machine learning model 224, the techniques described herein are not limited to training and executing an audio reliability machine learning model using the same computing system. For example, a first computing system may be configured to train audio reliability machine learning model 224 using training data 250. The first computing system may be configured to output the audio reliability machine learning model 224 to a second computing system configure to execute audio reliability machine learning model 224.

Figure 3:
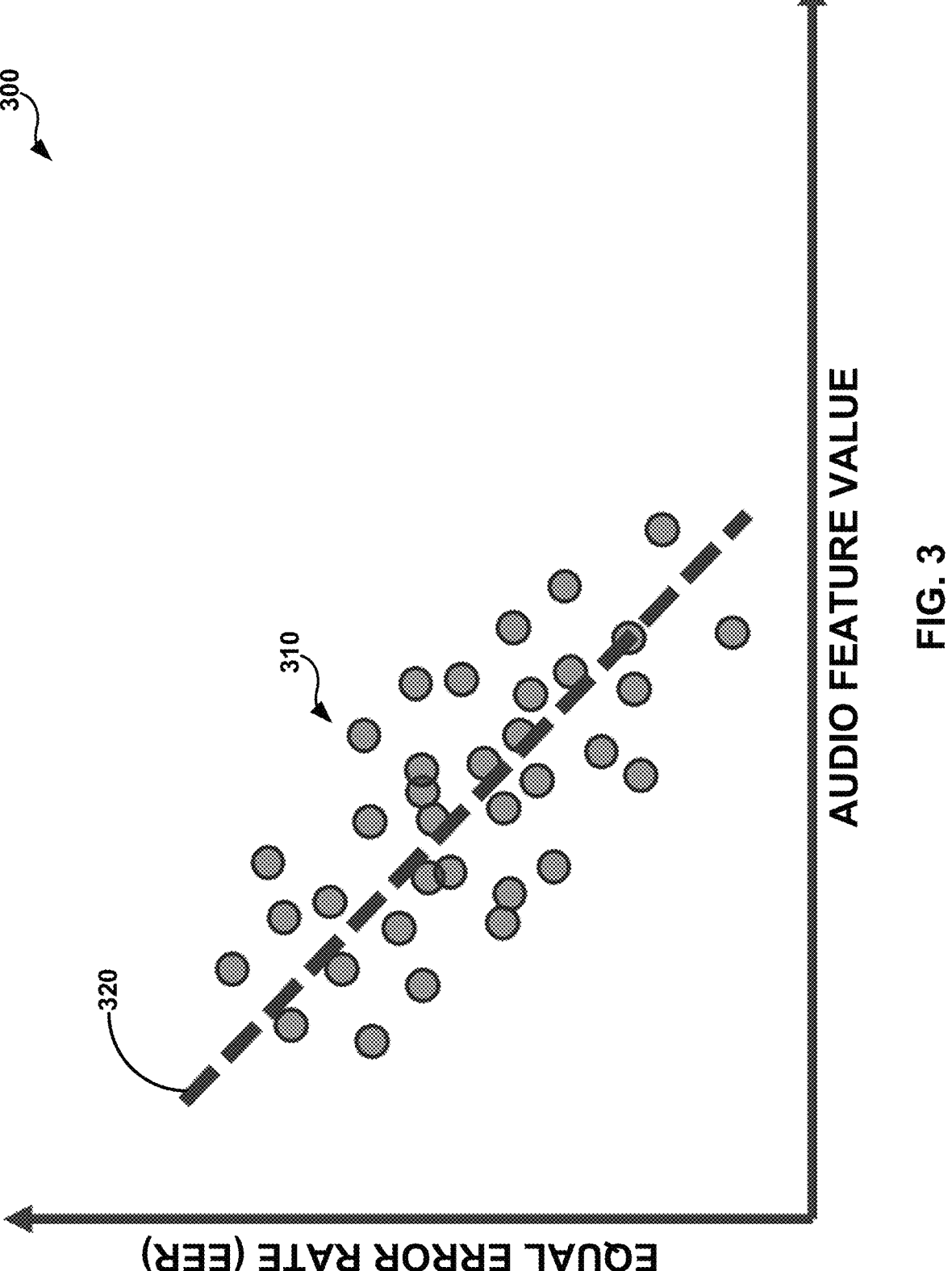
FIG. 3 is a plot diagram illustrating a plot including a set of points and a trend line, in accordance with one or more techniques of this disclosure.

FIG. 3 is a plot diagram illustrating a plot 300 including a set of points 310 and a trend line 320, in accordance with one or more techniques of this disclosure. In some examples, each point of the set of points 310 may be placed on the plot 300 which includes audio feature value on an x-axis equal error rate (EER) on a y-axis.

Each point of the set of points 310 may correspond to a speaker identification performed using an audio segment. That is, each point of the set of points 310 may correspond to an audio segment having an audio feature present at a certain audio feature value. When a speech processing model performs speaker identification using an audio segment, the system may determine an equal error rate (e.g., a quality) of the speaker identification. As seen in plot 300, audio segments having a higher audio feature value are generally associated with a lower EER. This is shown by trend line 320, which has a negative slope. The negative slope of trend line 320 may represent a correlation coefficient corresponding to the audio feature.

Figure 4A:
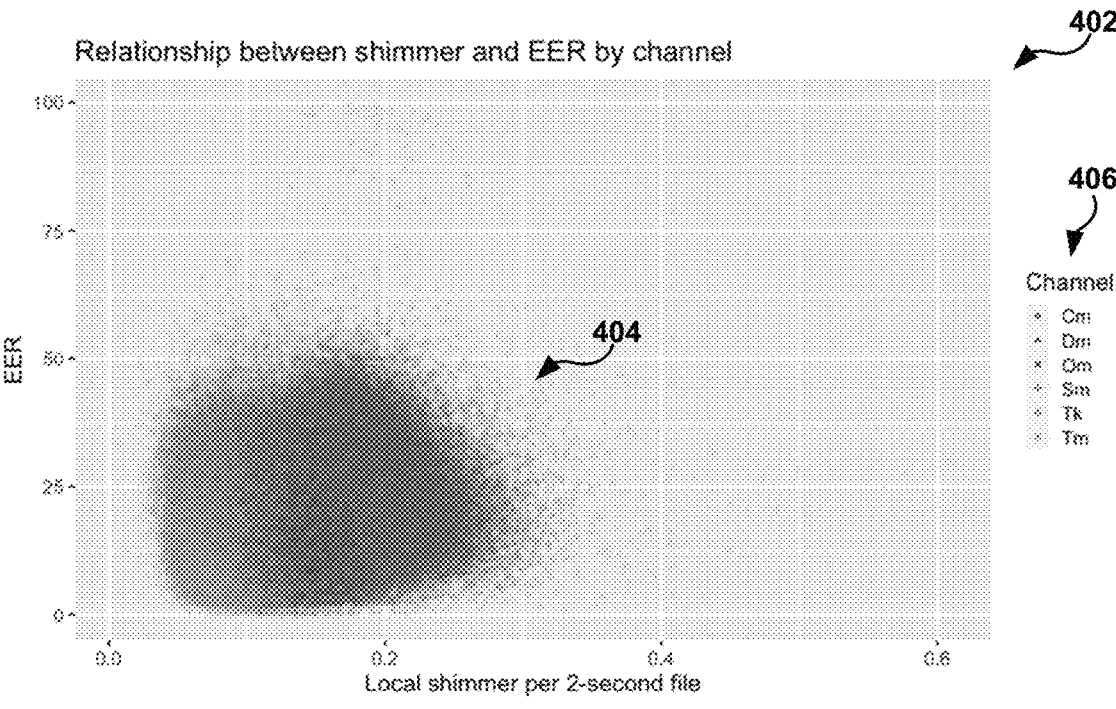
FIGS. 4A-4B are plot diagrams illustrating how the type of microphone used to collect audio data affects a quality of the audio data for speech processing, in accordance with one or more techniques of this disclosure.
Figure 4B:
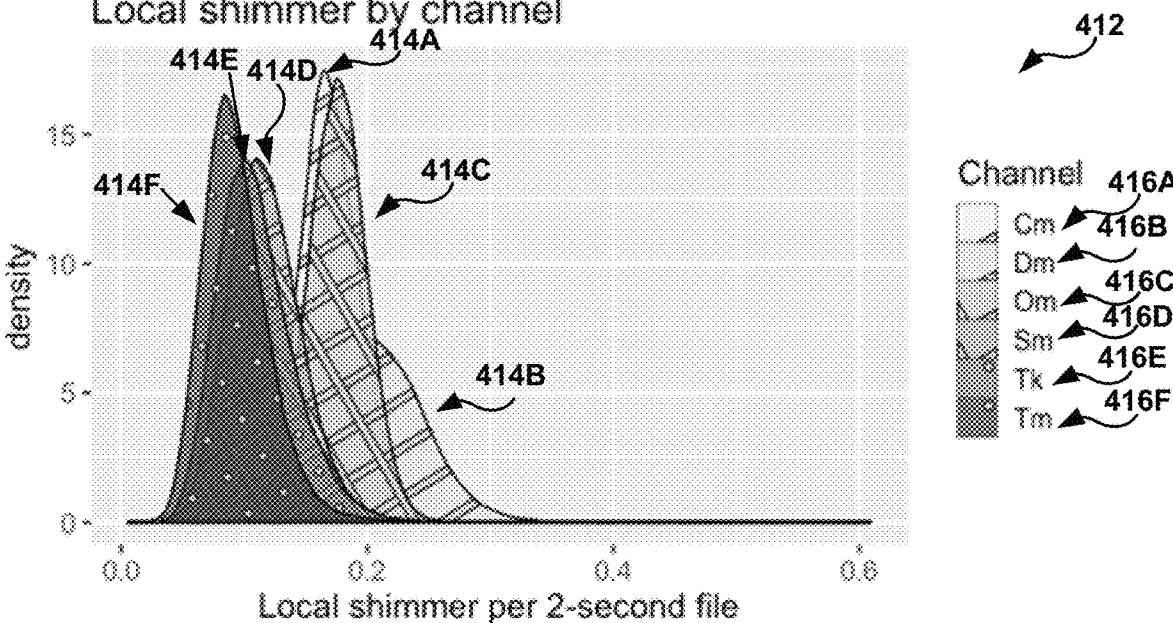

FIGS. 4A-4B are plot diagrams illustrating how the type of microphone used to collect audio data affects a quality of the audio data for speech processing, in accordance with one or more techniques of this disclosure. FIG. 4A includes a plot 402 of a plurality of points 404. Plot 402 includes shimmer on an x-axis and EER on the y-axis. The plurality of points may include one or more sets of points, each set of points of the set of points corresponding to a microphone type of a set of microphone types 406, As seen in FIG. 4A, each set of points of the one or more sets of points creates a different distribution on the plot 402, meaning that different microphone types result in different error rates in performing speaker identification. FIG. 4B includes a plot 412 of a set of distributions 414A-414F. In some examples, each distribution of the set of distributions 414 may correspond to a microphone type of a set of microphone types 416A-416F. For example, distribution 414A corresponds to microphone type 416A, distribution 41413 corresponds to microphone type 41613, and so on. As seen in FIG. 4B, some distributions of the set of distributions 414 may be wider than other distributions of the set of distributions 414. A wider distribution may indicate a greater uncertainty that audio data collected by the corresponding microphone type will be valuable for speaker identification.

FIG. 5 is a flow diagram illustrating an example technique for determining a reliability of audio data for speech processing, in accordance with one or more techniques of this disclosure. FIG. 5 is described with respect to systems 100 and 200 of FIGS. 1-2. However, the techniques of FIG. 5 may be performed by different components of systems 100 and 200 or by additional or alternative systems.

Computing system 102 may receive an audio dataset 104 comprising a sequence of audio segments (502), In some examples, the audio dataset 104 may include speech from a human speaker. In some examples, each audio segment of the sequence of segments corresponds to a portion of the audio dataset 104 during a window of time. In some examples, each audio segment of the sequence of audio segments includes a duration that is the same as each other audio segment of the sequence of audio segments.

Computing system 102 may extract, for each audio segment of the sequence of audio segments, a set of audio feature values corresponding to a set of audio features (504). In some examples, each audio feature value of the set of audio feature values indicates a prevalence of an audio feature of the set of audio features. Computing system 102 may use machine learning models and/or signal processing techniques to extract the set of audio feature values. Computing system 102 may execute a machine learning model to determine, for each audio segment of the sequence of audio segments, a reliability score based on the set of audio feature values corresponding to the respective audio segment, where the reliability score indicates a reliability of the audio segment for performing speech processing (506).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices, Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
    a storage device configured to store a machine learning model trained with audio feature values to determine a reliability of an audio segment for performing speech processing; and processing circuitry having access to the storage device and configured to:

receive an audio dataset comprising a sequence of audio segments including speech from an unknown speaker;

extract, for each audio segment of the sequence of audio segments, a set of audio feature values corresponding to a set of audio features, wherein each audio feature value of the set of audio feature values indicates a prevalence of the corresponding audio feature of the set of audio features in the audio segment;

execute the machine learning model to determine, for each audio segment of the sequence of audio segments, a reliability score based on the set of audio feature values corresponding to the respective audio segment, wherein the reliability score indicates a reliability of the audio segment for performing speech processing;

select, based on the reliability score for each audio segment, one or more audio segments from the sequence of audio segments;

store the one or more audio segments as most valuable for performing speaker identification;

determine, based on the one or more audio segments, a probability indicating whether the speech from the unknown speaker corresponds to a target speaker; and output an indication of the probability indicating whether the speech from the unknown speaker corresponds to the target speaker.

2. The computing system of claim 1, wherein to select the one or more audio segments from the sequence of audio segments, the processing circuitry is configured to:

identify, based on the respective reliability scores for the sequence of audio segments, one or more audio segments of the sequence of audio segments that are most valuable for performing speech processing.

3. The computing system of claim 1, wherein the storage device is further configured to store a speech processing model, wherein the speech from the unknown speaker included in the audio dataset is associated with an unknown target class, and wherein to determine the probability, the processing circuitry is further configured to:

determine, based on the one or more audio segments of the sequence of audio segments that are most valuable for performing speech processing and using the speech processing model, whether the unknown target class corresponding to the audio dataset is the same as a known target class corresponding to one or more reference audio datasets associated with the target speaker; and determine the probability based on information indicating whether the unknown target class corresponding to the audio dataset is the same as the known target class.

4. The computing system of claim 1, wherein the set of audio features includes any one or more of cycle-to-cycle changes in amplitude, cycle-to-cycle changes in frequency, signal-to-noise ratio (SNR), harmonics-to-noise ratio (HNR), degradation due to reverberation, emotional valence, level of speech activity, voicing probability, auto-correlation peak, mean spectral tilt, and standard deviation of spectral tilt.

5. The computing system of claim 1, wherein to extract the set of audio feature values for each audio segment of the sequence of audio segments, the processing circuitry is configured to:

calculate, based on a portion of the audio dataset corresponding to each audio segment of the sequence of audio segments, an audio feature value corresponding to each audio feature of the set of the set of audio features.

6. The computing system of claim 5, wherein the machine learning model is a first machine learning model, and wherein to calculate an audio feature value corresponding to each audio feature of the set of the set of audio features, the processing circuitry is configured to:

calculate, using a feature extraction signal processing model, a first one or more audio feature values corresponding to the respective audio segment; and execute one or more second machine learning models to determine, based on respective audio segment, a second one or more audio feature values.

7. The computing system of claim 1, wherein the audio dataset extends for a first duration of time, and wherein each audio segment of the sequence of audio segments comprises a portion of the audio dataset extending for a second duration of time that is shorter than the first duration of time.

8. The computing system of claim 1, wherein the processing circuitry is further configured to train the machine learning model.

9. The computing system of claim 8, wherein the storage device is further configured to store a speech processing model, wherein the storage device is configured to store training data comprising a plurality of training audio datasets, wherein each training audio dataset of the plurality of training audio datasets is known to include speech from a particular target class, wherein each training audio dataset of the plurality of training audio datasets comprises a sequence of training audio segments, and wherein to train the machine learning model, the processing circuitry is configured to:

execute a speech processing model to perform a plurality of speech processing determinations, wherein each speech processing determinations of the plurality of speech processing determinations involves determining whether a training audio segment of a training audio dataset corresponds to a particular target class;

determine, based on the particular target class known to be associated with each training audio dataset of the plurality of training audio datasets, a quality of each speech processing determination of the plurality of speech processing determinations;

identify one or more audio features of a plurality of audio features present in the training audio segment corresponding to each speech processing determination of the plurality of speech processing determinations; and select the set of audio features from the plurality of audio features based on the quality of each speech processing determination of the plurality of speech processing determinations and the one or more audio features of the plurality of audio features present in the audio segment corresponding to each speech processing determination of the plurality of speech processing determinations.

10. A method comprising:

receiving, by processing circuitry having access to a storage device configured to store a machine learning model trained with audio feature values to determine a reliability of an audio segment for performing speech processing, an audio dataset comprising a sequence of audio segments including speech from an unknown speaker;

extracting, by the processing circuitry for each audio segment of the sequence of audio segments, a set of audio feature values corresponding to a set of audio features, wherein each audio feature value of the set of audio feature values indicates a prevalence of the corresponding audio feature of the set of audio features in the audio segment;

executing, by the processing circuitry, the machine learning model to determine, for each audio segment of the sequence of audio segments, a reliability score based on the set of audio feature values corresponding to the respective audio segment, wherein the reliability score indicates a reliability of the audio segment for performing speech processing;

selecting, by the processing circuitry, based on the reliability score for each audio segment, one or more audio segments from the sequence of audio segments;

storing, by the processing circuitry, the one or more audio segments as most valuable for performing speaker identification;

determining, by the processing circuitry, based on the one or more audio segments, a probability indicating whether the speech from the unknown speaker corresponds to a target speaker; and outputting, by the processing circuitry, an indication of the probability indicating whether the speech from the unknown speaker corresponds to the target speaker.

11. The method of claim 10, wherein selecting the one or more audio segments from the sequence of audio segments comprises:

identifying, by the processing circuitry based on the respective reliability scores for the sequence of audio segments, one or more audio segments of the sequence of audio segments that are most valuable for performing speech processing.

12. The method of claim 10, wherein the storage device is further configured to store a speech processing model, wherein the speech from the unknown speaker included in the audio dataset is associated with an unknown target class, and wherein determining the probability comprises:

determining, by the processing circuitry, based on the one or more audio segments of the sequence of audio segments that are most valuable for performing speech processing and using the speech processing model, whether the unknown target class corresponding to the audio dataset is the same as a known target class corresponding to one or more reference audio datasets associated with the target speaker; and determining, by the processing circuitry, the probability based on information indicating whether the unknown target class corresponding to the audio dataset is the same as the known target class.

13. The method of claim 10, wherein extracting the set of audio feature values for each audio segment of the sequence of audio segments of the audio dataset comprises:

calculating, based on a portion of the audio dataset corresponding to each audio segment of the sequence of audio segments, an audio feature value corresponding to each audio feature of the set of the set of audio features.

14. The method of claim 13, wherein the machine learning model is a first machine learning model, and wherein calculating an audio feature value corresponding to each audio feature of the set of the set of audio features comprises:

calculating, by the processing circuitry, using a feature extraction signal processing model, a first one or more audio feature values corresponding to the respective audio segment; and executing, by the processing circuitry, one or more second machine learning models to determine, based on respective audio segment, a second one or more audio feature values.

15. The method of claim 10, wherein the audio dataset extends for a first duration of time, and wherein each audio segment of the sequence of audio segments comprises a portion of the audio dataset extending for a second duration of time that is shorter than the first duration of time.

16. The method of claim 15, wherein the second duration of time corresponding to each audio segment of the sequence of audio segments comprises two seconds, and wherein the sequence of audio segments comprises a sequence of non-overlapping two second time windows extending for a length of the audio dataset.

17. The method of claim 10, further comprising training, by the processing circuitry, the machine learning model.

18. The method of claim 17, wherein the storage device is further configured to store a speech processing model, wherein the storage device is configured to store training data comprising a plurality of training audio datasets, wherein each training audio dataset of the plurality of training audio datasets is known to include speech from a particular target class, wherein each training audio dataset of the plurality of training audio datasets comprises a sequence of training audio segments, and wherein training the machine learning model comprises:

executing, by the processing circuitry, a speech processing model to perform a plurality of speech processing determinations, wherein each speech processing determination of the plurality of speech processing determinations involves determining whether a training audio segment of a training audio dataset corresponds to a particular target class;

determining, by the processing circuitry based on the particular target class known to be associated with each training audio dataset of the plurality of training audio datasets, a quality of each speech processing determination of the plurality of speech processing determinations;

identifying, by the processing circuitry, one or more audio features of a plurality of audio features present in the training audio segment corresponding to each speech processing determination of the plurality of speech processing determinations; and selecting, by the processing circuitry, the set of audio features from the plurality of audio features based on the quality of each speech processing determination of the plurality of speech processing determinations and the one or more audio features of the plurality of audio features present in the audio segment corresponding to each speech processing determination of the plurality of speech processing determinations.

19. Non-transitory computer-readable media medium comprising instructions that, when executed by a processor, cause the processor to:

receive an audio dataset comprising a sequence of audio segments including speech from an unknown speaker;

extract, for each audio segment of the sequence of audio segments, a set of audio feature values corresponding to a set of audio features, wherein each audio feature value of the set of audio feature values indicates a prevalence of the corresponding audio feature of the set of audio features in the audio segment;

execute a machine learning model to determine, for each audio segment of the sequence of audio segments, a reliability score based on the set of audio feature values corresponding to the respective audio segment, wherein the reliability score indicates a reliability of the audio segment for performing speech processing;

select, based on the reliability score for each audio segment, one or more audio segments from the sequence of audio segments;

store the one or more audio segments as most valuable for performing speaker identification;

determine, based on the one or more audio segments, a probability indicating whether the speech from the unknown speaker corresponds to a target speaker; and output an indication of the probability indicating whether the speech from the unknown speaker corresponds to the target speaker.

20. A computing system comprising:

a storage device configured to store a machine learning model and training data comprising a plurality of training audio datasets, wherein each training audio dataset of the plurality of training audio datasets is known to include speech from a particular target class, wherein each training audio dataset of the plurality of training audio datasets comprises a sequence of training audio segments; and processing circuitry having access to the storage device, configured to determine a probability indicating whether speech from an unknown speaker corresponds to a target speaker, and configured to train the machine learning model to determine a reliability of an audio segment for performing speech processing, wherein to train the machine learning model, the processing circuitry is configured to:

execute a speech processing model to perform a plurality of speech processing determinations, wherein each speech processing determination of the plurality of speech processing determinations involves determining whether a training audio segment of a training audio dataset corresponds to a particular target class;

determine, based on the particular target class known to be associated with each training audio dataset of the plurality of training audio datasets, a quality of each speech processing determination of the plurality of speech processing determinations;

identify one or more audio features of a plurality of audio features present in the training audio segment corresponding to each speech processing determination of the plurality of speech processing determinations; and select a set of audio features of the plurality of audio features based on the quality of each speech processing determination of the plurality of speech processing determinations and the one or more audio features of the plurality of audio features present in the audio segment corresponding to each speech processing determination of the plurality of speech processing determinations, and wherein to determine the probability indicating whether speech from the unknown speaker corresponds to the target speaker, the processing circuitry is configured to:

receive an audio dataset comprising a sequence of audio segments including speech from the unknown speaker;

extract, for each audio segment of the sequence of audio segments, a set of audio feature values corresponding to the set of audio features, wherein each audio feature value of the set of audio feature values indicates a prevalence of the corresponding audio feature of the set of audio features in the audio segment;

execute the machine learning model to determine, for each audio segment of the sequence of audio segments, a reliability score based on the set of audio feature values corresponding to the respective audio segment, wherein the reliability score indicates a reliability of the audio segment for performing speech processing;

select, based on the reliability score for each audio segment, one or more audio segments from the sequence of audio segments;

store the one or more audio segments as most valuable for performing speaker identification;

determine, based on the one or more audio segments, a probability indicating whether the speech from the unknown speaker corresponds to the target speaker; and output an indication of the probability indicating whether the speech from the unknown speaker corresponds to the target speaker.

* * * * *